(12) United States Patent
Furukawa et al.

(10) Patent No.: US 11,469,053 B2
(45) Date of Patent: Oct. 11, 2022

(54) CAPACITOR ARRAY, COMPOSITE ELECTRONIC COMPONENT, METHOD FOR MANUFACTURING CAPACITOR ARRAY, AND METHOD FOR MANUFACTURING COMPOSITE ELECTRONIC COMPONENT

(71) Applicant: Murata Manufacturing Co., Ltd., Nagaokakyo (JP)

(72) Inventors: Takeshi Furukawa, Nagaokakyo (JP); Misato Miyake, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/108,015

(22) Filed: Dec. 1, 2020

(65) Prior Publication Data
US 2021/0082630 A1    Mar. 18, 2021

Related U.S. Application Data

(63) Continuation of application No. PCT/JP2019/021936, filed on Jun. 3, 2019.

(30) Foreign Application Priority Data

Jun. 11, 2018    (JP) .............................. JP2018-111162

(51) Int. Cl.
*H01G 9/10*        (2006.01)
*H01G 9/15*        (2006.01)
(Continued)

(52) U.S. Cl.
CPC ................. *H01G 9/10* (2013.01); *H01G 9/08* (2013.01); *H01G 9/15* (2013.01); *H01G 9/26* (2013.01);
(Continued)

(58) Field of Classification Search
CPC ....................................................... H01G 4/38
(Continued)

(56) References Cited

U.S. PATENT DOCUMENTS 5,926,363 A    7/1999    Kuriyama
7,280,343 B1 *   10/2007   Zednicek ............... H01G 9/012
                                                                           361/541
(Continued)

FOREIGN PATENT DOCUMENTS

CN          1938801 A      3/2007
CN       101627449 A      1/2010
(Continued)

OTHER PUBLICATIONS

International Search Report Issued for PCT/JP2019/021936, dated Aug. 20, 2019.
(Continued)

*Primary Examiner* — Eric W Thomas
(74) *Attorney, Agent, or Firm* — ArentFox Schiff LLP

(57) ABSTRACT

A capacitor array that includes a plurality of solid electrolytic capacitor elements each of which has a first main surface and a second main surface facing each other in a thickness direction and includes an anode plate made of a valve action metal, a porous layer on at least one surface of the anode plate, a dielectric layer on a surface of the porous layer, and a cathode layer on a surface of the dielectric layer and including a solid electrolyte layer; a first sealing layer in a sheet-like shape and covering the first main surface of the plurality of solid electrolytic capacitor elements; and a second sealing layer in a sheet-like shape and covering the second main surface of the plurality of solid electrolytic capacitor elements.

9 Claims, 22 Drawing Sheets

(51) Int. Cl.
*H01G 9/26* (2006.01)
*H01G 9/28* (2006.01)
*H01G 9/08* (2006.01)
H01G 9/042 (2006.01)
H01G 9/07 (2006.01)
H01G 2/10 (2006.01)

(52) U.S. Cl.
CPC .............. *H01G 9/28* (2013.01); *H01G 2/106* (2013.01); *H01G 9/042* (2013.01); *H01G 9/07* (2013.01)

(58) Field of Classification Search
USPC ......................................... 361/541
See application file for complete search history.

(56) References Cited

U.S. PATENT DOCUMENTS

| | | | |
|---|---|---|---|
| 7,304,833 | B1 | 12/2007 | Kobayashi |
| 2005/0225930 | A1 | 10/2005 | Stieglbauer et al. |
| 2007/0177336 | A1* | 8/2007 | Kuriyama ................ H01G 9/10 |
| | | | 29/25.42 |
| 2007/0211414 | A1* | 9/2007 | Pelcak .................... H01G 9/28 |
| | | | 361/541 |
| 2007/0230093 | A1 | 10/2007 | Kobayashi |
| 2008/0216296 | A1 | 9/2008 | Prymak et al. |

FOREIGN PATENT DOCUMENTS

| | | | |
|---|---|---|---|
| JP | 2004288793 | A | 10/2004 |
| JP | 2005158903 | A * | 6/2005 |
| JP | 2006173441 | A | 6/2006 |
| JP | 2007266247 | A | 10/2007 |
| JP | 2009182276 | A | 8/2009 |
| JP | 2009188219 | A | 8/2009 |
| JP | 2014203850 | A | 10/2014 |
| WO | 2003107367 | A1 | 12/2003 |

OTHER PUBLICATIONS

Written Opinion of the International Searching Authority issued for PCT/JP2019/021936, dated Aug. 20, 2019.
Chinese Office Action issued for Chinese Application No. 201980038369.2, dated Aug. 30, 2021.

* cited by examiner

CAPACITOR ARRAY, COMPOSITE ELECTRONIC COMPONENT, METHOD FOR MANUFACTURING CAPACITOR ARRAY, AND METHOD FOR MANUFACTURING COMPOSITE ELECTRONIC COMPONENT

CROSS REFERENCE TO RELATED APPLICATIONS

The present application is a continuation of International application No. PCT/JP2019/021936, filed Jun. 3, 2019, which claims priority to Japanese Patent Application No. 2018-111162, filed Jun. 11, 2018, the entire contents of each of which are incorporated herein by reference.

FIELD OF THE INVENTION

The present invention relates to a capacitor array, a composite electronic component, a method for manufacturing a capacitor array, and a method for manufacturing a composite electronic component.

BACKGROUND OF THE INVENTION

A solid electrolytic capacitor typically includes a solid electrolytic capacitor element having an anode plate made of a valve action metal such as aluminum, a porous layer on a main surface of the anode plate, a dielectric layer on a surface of the porous layer, and a cathode layer on a surface of the dielectric layer and including a solid electrolyte layer.

Patent Document 1 discloses a solid electrolytic capacitor including a capacitor element having one anode portion and one cathode portion, and a substrate on which the capacitor element is mounted. The solid electrolytic capacitor described in Patent Document 1 includes an anode pattern connected to the anode portion and a cathode pattern connected to the cathode portion that are formed on a capacitor-element mounting surface of the substrate, and a plurality of pairs of anode terminals and cathode terminals that are formed on a back surface of the substrate. The back surface is a surface opposite to the capacitor-element mounting surface. Each of the anode terminals is connected to the anode portion of the capacitor element through a conductive path formed in or on the substrate and the anode pattern formed on the capacitor-element mounting surface. In contrast, each of the cathode terminals is connected to the cathode portion of the capacitor element through a conductive path formed in or on the substrate and the cathode pattern formed on the capacitor-element mounting surface.

Thus, the solid electrolytic capacitor described in Patent Document 1 can function as a multiterminal-pair solid electrolytic capacitor when the solid electrolytic capacitor is mounted on a mounting substrate at a back surface of the solid electrolytic capacitor and a predetermined voltage is applied to the plurality of pairs of anode terminals and cathode terminals formed on the back surface. That is, the solid electrolytic capacitor described in Patent Document 1 is a multiterminal-pair solid electrolytic capacitor using a capacitor element of a two-terminal type.

Patent Document 1: Japanese Patent Application Laid-Open No. 2007-266247

SUMMARY OF THE INVENTION

In the solid electrolytic capacitor described in Patent Document 1, the anode is common and the cathode only has multiple terminals, and thus the solid electrolytic capacitor element cannot be handled as an individual solid electrolytic capacitor element.

In contrast, when a plurality of solid electrolytic capacitor elements are individually mounted, a certain mounting area is required around one solid electrolytic capacitor element to cause an increase in the entire mounting area. The plurality of solid electrolytic capacitor elements also require mounting multiple times, and thus causes an increase in the mounting cost.

The present invention is made to solve the above problems, and an object of the present invention is to provide a capacitor array capable of integrating a plurality of solid electrolytic capacitor elements. The present invention is also made to provide a composite electronic component in which an electronic component is mounted on external electrodes of the capacitor array, a method for manufacturing the capacitor array, and a method for manufacturing the composite electronic component.

A capacitor array of the present invention includes a plurality of solid electrolytic capacitor elements each of which has a first main surface and a second main surface facing each other in a thickness direction and includes an anode plate made of a valve action metal, a porous layer on at least one surface of the anode plate, a dielectric layer on a surface of the porous layer, and a cathode layer on a surface of the dielectric layer and including a solid electrolyte layer; a first sealing layer in a sheet-like shape and covering the first main surface of the plurality of solid electrolytic capacitor elements; and a second sealing layer in a sheet-like shape and covering the second main surface of the plurality of solid electrolytic capacitor elements.

A composite electronic component of the present invention includes the capacitor array of the present invention, external electrodes outside the first sealing layer or the second sealing layer of the capacitor array and respectively electrically connected to the anode plate and the cathode layer of the capacitor array, and an electronic component electrically connected to the external electrodes.

A method for manufacturing a capacitor array according to a first aspect of the present invention includes: preparing a solid electrolytic capacitor sheet that has a first main surface and a second main surface facing each other in a thickness direction and that includes an anode plate made of a valve action metal, a porous layer on at least one surface of the anode plate, a dielectric layer on a surface of the porous layer, and a cathode layer on a surface of the dielectric layer and including a solid electrolyte layer; disposing a first sealing layer in a sheet-like shape on the first main surface of the solid electrolytic capacitor sheet; cutting the solid electrolytic capacitor sheet in the thickness direction from the second main surface to split the solid electrolytic capacitor sheet into a plurality of solid electrolytic capacitor elements disposed on the first sealing layer; and disposing a second sealing layer in a sheet-like shape so as to cover the second main surface of the plurality of solid electrolytic capacitor elements that are on the first sealing layer.

A method for manufacturing a capacitor array according to a second aspect of the present invention includes the steps of: preparing a plurality of solid electrolytic capacitor elements each of which has a first main surface and a second main surface facing each other in a thickness direction and that includes an anode plate made of a valve action metal, a porous layer on at least one surface of the anode plate, a dielectric layer on a surface of the porous layer, and a cathode layer on a surface of the dielectric layer and including a solid electrolyte layer; providing a first sealing layer in a sheet-like shape, the first sealing layer having a plurality of element housing spaces; disposing each of the plurality of solid electrolytic capacitor elements in corresponding one of the plurality of element housing spaces such that the first main surface of each of the plurality of the solid electrolytic capacitor elements is disposed on the first sealing layer; and disposing a second sealing layer in a sheet-like shape so as to cover the second main surface of the plurality of solid electrolytic capacitor elements that are on the first sealing layer.

A method for manufacturing a composite electronic component of the present invention includes: manufacturing a capacitor array by the method for manufacturing a capacitor array of the present invention; forming external electrodes outside the first sealing layer or the second sealing layer of the capacitor array so that the external electrodes are respectively electrically connected to the anode plate and the cathode layer of the capacitor array; and electrically connecting an electronic component to the external electrodes.

The present invention enables providing a capacitor array capable of integrating a plurality of solid electrolytic capacitor elements.

DETAILED DESCRIPTION OF THE INVENTION

Hereinafter, a capacitor array and a composite electronic component of the present invention will be described. However, the present invention is not limited to the following structure, and can be appropriately modified and applied without changing the gist of the present invention. The present invention also includes a combination of two or more individual desirable structures of the present invention described below.

[Capacitor Array]

The capacitor array of the present invention includes a plurality of solid electrolytic capacitor elements each having a first main surface and a second main surface facing each other in a thickness direction, a first sealing layer in a sheet-like shape and covering the first main surface of the plurality of solid electrolytic capacitor elements, and a second sealing layer in a sheet-like shape and covering the second main surface of the plurality of solid electrolytic capacitor elements. Each of the plurality of solid electrolytic capacitor elements includes an anode plate made of a valve action metal, a porous layer on at least one surface of the anode plate, a dielectric layer on a surface of the porous layer, and a cathode layer on a surface of the dielectric layer and including a solid electrolyte layer.

Each embodiment is exemplified below, and it is needless to say that structure illustrated in different embodiments can be partly replaced or combined. In the second and subsequent embodiments, description of matters common to the first embodiment will be omitted, and only different points will be described. In particular, a similar effect of a similar structure will not be sequentially referred to for each embodiment.

Hereinafter, when embodiments are not distinguished from each other, a capacitor array of each embodiment is simply referred to as the "capacitor array of the present invention".

First Embodiment

A capacitor array according to a first embodiment of the present invention is configured such that a second sealing layer extends toward a first sealing layer and into a gap between anode plates of adjacent solid electrolytic capacitor elements of the plurality of solid electrolytic capacitor elements, and further extends into part of the first sealing layer. The above structure improves adhesion between the first sealing layer and the second sealing layer and the capacitor array is thus improved in reliability.

The capacitor array of the present invention includes the first sealing layer and the second sealing layer each of which contains a sealing resin such as epoxy resin or phenol resin. To prevent the sealing layers from applying stress to an element portion when the capacitor array is formed and thermal stress is loaded, Tg and the modulus of elasticity of each of the sealing layers need to be controlled. Specifically, the sealing layers are each preferably well filled with an inorganic filler such as alumina or silica.

Figure 1:
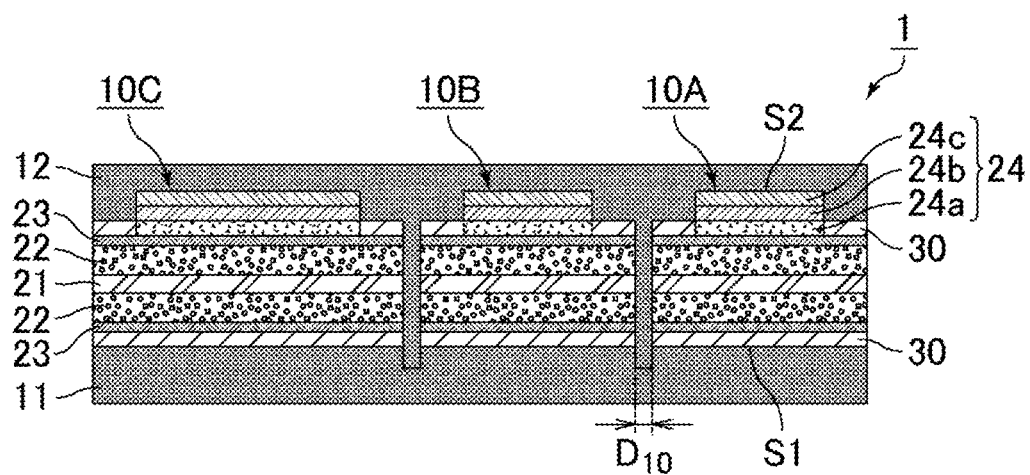
FIG. 1 is a sectional view schematically illustrating an example of a capacitor array according to a first embodiment of the present invention.

FIG. 1 is a sectional view schematically illustrating an example of the capacitor array according to the first embodiment of the present invention. FIG. 1 illustrates a capacitor array 1 that includes a plurality of solid electrolytic capacitor elements 10A, 10B, and 10C, a first sealing layer 11 in a sheet-like shape, and a second sealing layer 12 in a sheet-like shape. The solid electrolytic capacitor element 10A has a first main surface S1 and a second main surface S2 facing each other in a thickness direction (top-bottom direction in FIG. 1), and the first main surface S1 is disposed on the first sealing layer 11. The same applies to the solid electrolytic capacitor elements 10B and 10C. The second sealing layer 12 is disposed covering the plurality of solid electrolytic capacitor elements 10A, 10B, and 10C on the first sealing layer 11 from the second main surface S2. Thus, the capacitor array 1 illustrated in FIG. 1 as a whole has a sheet-like shape.

The capacitor array 1 illustrated in FIG. 1 includes the solid electrolytic capacitor element 10A including an anode plate 21, a porous layer 22 provided on at least one main surface of the anode plate 21, a dielectric layer 23 provided on a surface of the porous layer 22, and a cathode layer 24 provided on a surface of the dielectric layer 23. FIG. 1 illustrates the cathode layer 24 including a solid electrolyte layer 24a provided on the surface of the dielectric layer 23, a carbon layer 24b provided on a surface of the solid electrolyte layer 24a, and a copper layer 24c provided on a surface of the carbon layer 24b. Although the anode plate 21 illustrated in FIG. 1 is provided with the porous layer 22 and the dielectric layer 23 on both of its main surfaces and the cathode layer 24 is provided only close to the second main surface S2, the cathode layer 24 may be provided only close to the first main surface S1, or close to both the first main surface S1 and the second main surface S2. The porous layer 22 may be provided on both the main surfaces of the anode plate 21, or may be provided on any one of the main surfaces thereof. The same applies to the solid electrolytic capacitor elements 10B and 10C. The solid electrolytic capacitor elements 10A, 10B, and 10C may be identical in structure, or may be different in structure partly or wholly.

Figure 8A:
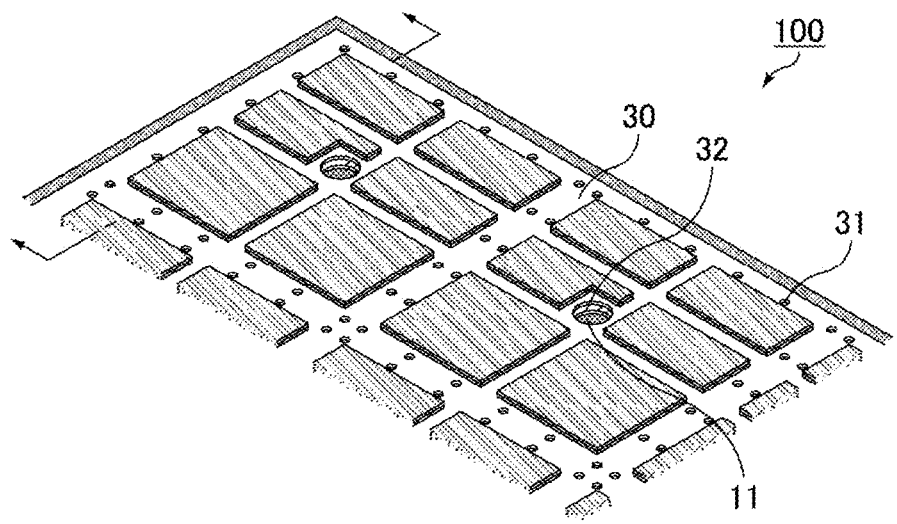
FIG. 8A is a perspective view schematically illustrating an example of a step of disposing a first sealing layer.
Figure 8B:
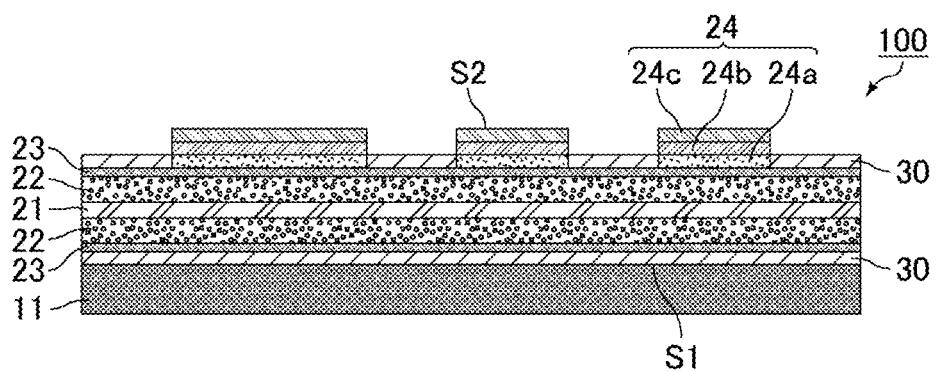
FIG. 8B is a sectional view thereof.

When the solid electrolytic capacitor elements 10A, 10B, and 10C are identical in structure, the solid electrolytic capacitor elements 10A, 10B, and 10C are preferably originally formed of one solid electrolytic capacitor sheet 100 (see, for example, FIGS. 8A and 8B). In this case, the solid electrolytic capacitor sheet 100 is split, by a sheet-removing portion in a slit-like shape, between the solid electrolytic capacitor element 10A and the solid electrolytic capacitor element 10B and between the solid electrolytic capacitor element 10B and the solid electrolytic capacitor element 10C.

As illustrated in FIG. 1, a distance from a bottom surface of the second sealing layer 12 to the anode plate 21 of each of the solid electrolytic capacitor elements 10A, 10B, and 10C is preferably uniform.

The capacitor array 1 illustrated in FIG. 1 is configured such that the second sealing layer 12 extends toward the first sealing layer 11 and into a gap between the anode plates 21 of the solid electrolytic capacitor elements adjacent to each other on the first sealing layer 11, and further extends into part of the first sealing layer 11.

As illustrated in FIG. 1, an insulating layer 30 for insulating the anode plate 21 from the cathode layer 24 is preferably provided on a surface of the dielectric layer 23 that is not covered by the cathode layer 24. Although FIG. 1 illustrates the insulating layer 30 on a surface of the dielectric layer 23, the insulating layer 30 may be omitted.

Although not illustrated in FIG. 1, external electrodes connected to the anode plate 21 and the cathode layer 24 are provided outside the first sealing layer 11 or the second sealing layer 12, as described later.

Although a form in which the anode plate or the cathode layer is connected to the external electrode is not particularly limited, a through-electrode passing through the first sealing layer or the second sealing layer in the thickness direction is preferably provided to connect the external electrode to the anode plate or the cathode layer using the through-electrode. Using the through-electrode enables an extending distance from the anode plate or the cathode layer to the external electrode to be shortened.

Although the capacitor array 1 illustrated in FIG. 1 includes the solid electrolytic capacitor elements 10A and 10C each having a side surface exposed, the side surface may be covered with the first sealing layer or the second sealing layer, or with the insulating layer, for example. For example, a stress-relaxation layer, a moisture-proof film, or the like may be provided between the solid electrolytic capacitor element and the first sealing layer or the second sealing layer.

Although the capacitor array according to the first embodiment of the present invention is preferably configured such that the second sealing layer extends toward the first sealing layer and into a gap between anode plates of all the solid electrolytic capacitor elements adjacent to each other on the first sealing layer, and further extends into part of the first sealing layer, part of the first sealing layer may have a portion into which the second sealing layer does not extend.

Although the capacitor array according to the first embodiment of the present invention has a distance $D_{10}$ between the anode plates of the solid electrolytic capacitor elements adjacent to each other on the first sealing layer that is not particularly limited, the distance is preferably 30 µm to 500 µm, and more preferably 50 µm to 150 µm.

The number of solid electrolytic capacitor elements disposed on the first sealing layer in the capacitor array of the present invention is not particularly limited as long as it is two or more. The solid electrolytic capacitor elements may be disposed linearly or planarly on the first sealing layer. The solid electrolytic capacitor elements may also be disposed regularly or irregularly on the first sealing layer. The solid electrolytic capacitor elements may be identical in size, shape, or the like, or may be different in size, shape, or the like, partly or wholly.

The capacitor array of the present invention includes the insulating layer 30 that is preferably made of resin. Examples of the resin constituting the insulating layer include insulating resins such as polyphenylsulfone resin, polyethersulfone resin, cyanate ester resin, fluororesin such as tetrafluoroethylene and tetrafluoroethylene/perfluoroalkyl vinyl ether copolymer, polyimide resin, polyamide-imide resin, epoxy resin, and derivatives or precursors of these resins. The insulating layer 30 may be made of the same resin as the first sealing layer 11 and the second sealing layer 12. Unlike the first sealing layer and the second sealing layer, the insulating layer is preferably based on resin alone because an insulating layer containing an inorganic filler may adversely affect an effective portion of the solid electrolytic capacitor element.

The capacitor array of the present invention includes the first sealing layer and the second sealing layer each of which is preferably made of resin. Examples of the resin constituting the first sealing layer and the second sealing layer include epoxy resin, phenol resin, and the like. The first sealing layer and the second sealing layer preferably contain an inorganic filler such as alumina or silica. The resin constituting the first sealing layer may be the same as or different from the resin constituting the second sealing layer.

Each of the first sealing layer and the second sealing layer may be composed of one layer alone, or may be composed of two or more layers. The first sealing layer may be or may not be composed of as many layers as in the second sealing layer. When the first sealing layer or the second sealing layer is composed of two or more layers, a through-electrode passing in the thickness direction through each of the two or more sealing layers existing between the anode plate or the cathode layer and the external electrode, and an internal electrode between the two or more sealing layers may be provided to connect the anode plate or the cathode layer to the external electrode via the through-electrode and the internal electrode.

The capacitor array of the present invention includes the anode plate of the solid electrolytic capacitor element that is made of a valve action metal exhibiting so-called valve action. Examples of the valve action metal include simple metals such as aluminum, tantalum, niobium, titanium and zirconium, and alloys containing these metals. Among these metals, aluminum or aluminum alloy is preferable.

The anode plate preferably has a plate-like shape, and more preferably has a foil-like shape. The anode plate needs only to have a porous layer on at least one main surface thereof, but may have porous layers on both opposed main surfaces. The porous layer is preferably an etching layer formed on a surface of the anode plate.

The anode plate excluding the porous layer preferably has a thickness of 5 µm to 100 µm, and the porous layer on one side preferably has a thickness of 5 µm to 200 µm.

In the capacitor array of the present invention, the dielectric layer of the solid electrolytic capacitor element is provided on the surface of the porous layer. The dielectric layer formed on the surface of the porous layer reflects a surface state of the porous layer, and has a fine uneven surface shape. The dielectric layer is preferably composed of an oxide film of the valve action metals described above. When aluminum foil is, for example, used as the anode plate, the dielectric layer composed of an oxide film can be formed by performing anodizing (also called chemical conversion treatment) on a surface of the aluminum foil in an aqueous solution containing ammonium adipate or the like.

In the capacitor array of the present invention, the cathode layer of the solid electrolytic capacitor element includes a solid electrolyte layer. The solid electrolyte layer is provided on a surface of the dielectric layer, and a conductor layer is preferably provided on a surface of the solid electrolyte layer.

Examples of a material constituting the solid electrolyte layer include conductive polymers such as polypyrroles, polythiophenes, and polyanilines. Among these materials, polythiophenes are preferable, and poly(3,4-ethylenedioxythiophene), called PEDOT, is particularly preferable. The conductive polymers may each contain a dopant such as polystyrene sulfonic acid (PSS). The solid electrolyte layer preferably includes an inner layer that fills pores of the dielectric layer and an outer layer that covers the dielectric layer.

The conductor layer includes at least one of a conductive resin layer and a metal layer. The conductor layer is preferably composed of a conductive resin layer as a base and a metal layer thereon. The conductor layer may be composed of only the conductive resin layer or only the metal layer. The conductor layer preferably covers the entire surface of the solid electrolyte layer.

Examples of the conductive resin layer include a conductive adhesive layer containing at least one conductive filler selected from the group consisting of silver filler, copper filler, nickel filler, and carbon filler.

Examples of the metal layer include a metal plating film and metal foil. The metal layer is preferably made of at least one metal selected from the group consisting of nickel, copper, silver, and alloys containing any of these metals as a main component. The "main component" means an element component having the largest abundance ratio (weight %) of all elements, and not necessarily more than 50% of the total of all the elements.

The capacitor array according to the first embodiment of the present invention is preferably manufactured as follows.

A method for manufacturing the capacitor array according to the first embodiment of the present invention includes: preparing a solid electrolytic capacitor sheet that has a first main surface and a second main surface facing each other in a thickness direction; disposing a first sealing layer in a sheet-like shape on the first main surface of the solid electrolytic capacitor sheet; cutting the solid electrolytic capacitor sheet in the thickness direction from the second main surface to split the solid electrolytic capacitor sheet into a plurality of solid electrolytic capacitor elements disposed on the first sealing layer; and disposing a second sealing layer in a sheet-like shape so as to cover the second main surface of the plurality of solid electrolytic capacitor elements.

When a plurality of solid electrolytic capacitor elements are individually disposed on the first sealing layer, a clearance needs to be provided between adjacent solid electrolytic capacitor elements. Thus, an increase in the number of solid electrolytic capacitor elements increases a percentage of the clearance, and thus a percentage of the effective portion of the solid electrolytic capacitor elements decreases. In contrast, the method for manufacturing the capacitor array according to the first embodiment of the present invention enables a capacitor array having a large percentage of the effective portion of the solid electrolytic capacitor elements to be manufactured by cutting the solid electrolytic capacitor sheet from the second main surface while the first sealing layer is disposed on the first main surface of the solid electrolytic capacitor sheet and splitting the solid electrolytic capacitor sheet into a plurality of solid electrolytic capacitor elements.

Hereinafter, an example of each step will be described.

First, as illustrated in FIGS. 2A, 2B, 3A, 3B, 4, 5A, 5B, 6A, 6B, 7A, and 7B, a solid electrolytic capacitor sheet is prepared.

Figure 2A:
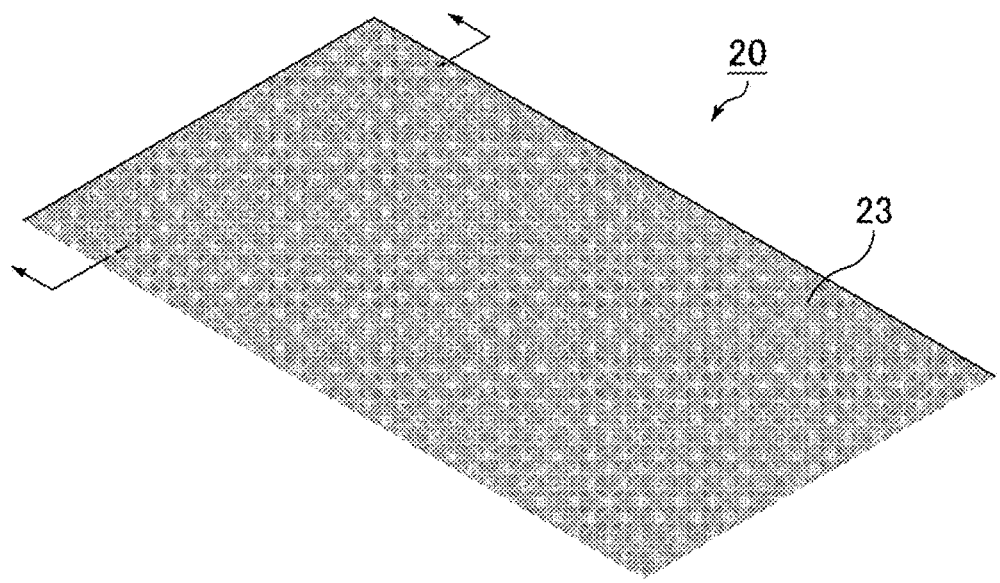
FIG. 2A is a perspective view schematically illustrating an example of a step of preparing conversion foil.
Figure 2B:
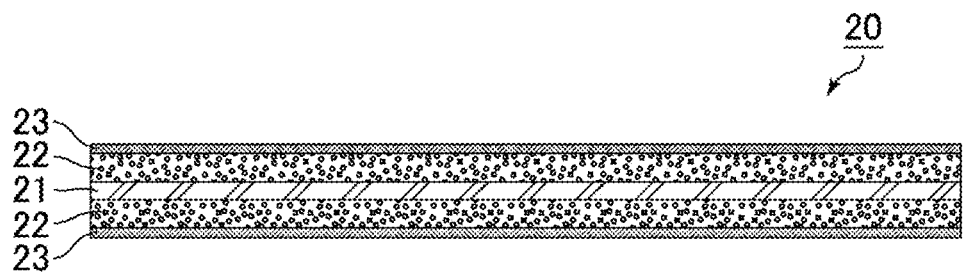
FIG. 2B is a sectional view thereof.

FIG. 2A is a perspective view schematically illustrating an example of a step of preparing conversion foil, and FIG. 2B is a sectional view thereof. A conversion foil 20 made of aluminum or the like is prepared as an anode plate 21 having a porous layer 22 provided on at least one main surface and a dielectric layer 23 provided on a surface of the porous layer 22. Instead of the conversion foil 20, for example, an aluminum foil may be prepared as an anode plate, a porous layer is formed by etching a surface of the aluminum foil and is then anodized in an aqueous solution containing ammonium adipate or the like, and a dielectric layer composed of an oxide film is thus formed.

Figure 3A:
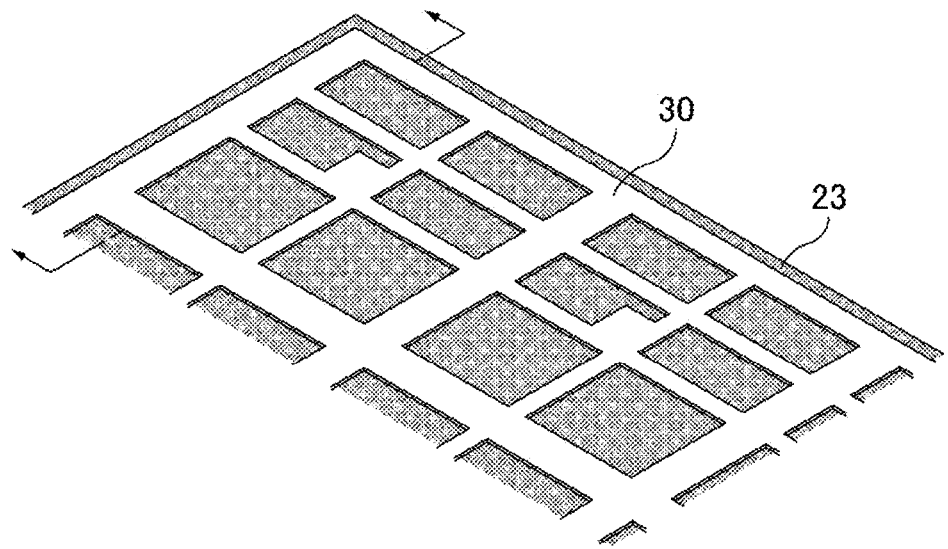
FIG. 3A is a perspective view schematically illustrating an example of a step of forming an insulating layer.
Figure 3B:
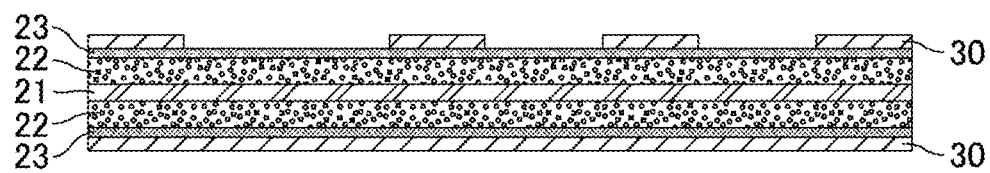
FIG. 3B is a sectional view thereof.

FIG. 3A is a perspective view schematically illustrating an example of a step of forming an insulating layer, and FIG. 3B is a sectional view thereof. To section an effective portion of the solid electrolytic capacitor element, an insulating resin is applied on the dielectric layer 23 to form an insulating layer 30. The method for applying an insulating resin is not particularly limited, and examples thereof include a method using a dispenser, and screen printing. FIG. 3A illustrates a region in which three by two, that is, a total of six solid electrolytic capacitor elements are mounted, the region being defined as one capacitor array unit.

Figure 4:
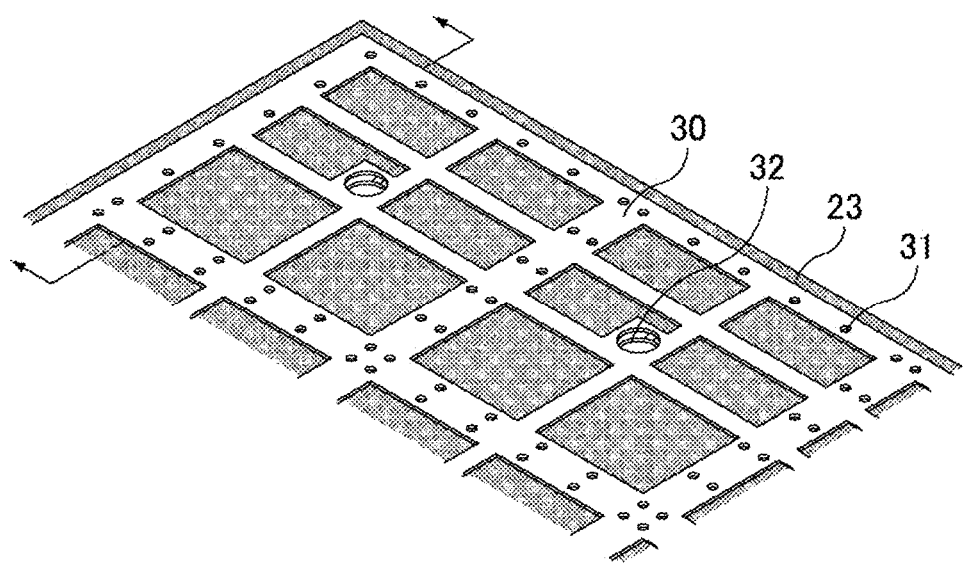
FIG. 4 is a perspective view schematically illustrating an example of a step of forming a through-hole.

FIG. 4 is a perspective view schematically illustrating an example of a step of forming a through-hole. Through-holes 31 are formed at predetermined positions around the capacitor array unit and pass through the chemical conversion foil 20 formed with the insulating layer 30 in the thickness direction.

As described below, a through-electrode is formed in the through-holes 31. The through-electrode is used for connecting the anode plate to an external electrode or connecting a cathode layer to an external electrode. The through-electrode may be used for connecting cathode layers, formed with the anode plate interposed therebetween, to each other. The through-electrode may also be used for a connection other than the above. As described in above, the capacitor array of the present invention serves as a composite electronic component when an electronic component is mounted on the capacitor array. The composite electronic component is configured such that the external electrode of the capacitor array and the electronic component are connected in the thickness direction via the through-electrode formed in the through-hole 31, or electronic components other than the capacitor array are connected to each other in the thickness direction via the through-electrode formed in the through-hole 31.

As illustrated in FIG. 4, a through-hole 32 for disposing a capacitor element different in type from the solid electrolytic capacitor element may be further formed.

Figure 5A:
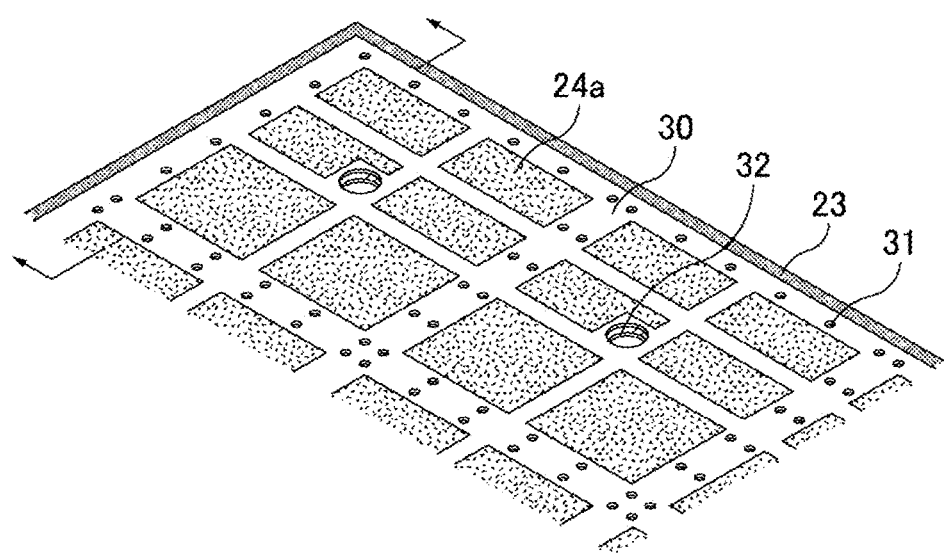
FIG. 5A is a perspective view schematically illustrating an example of a step of forming a solid electrolyte layer.
Figure 5B:
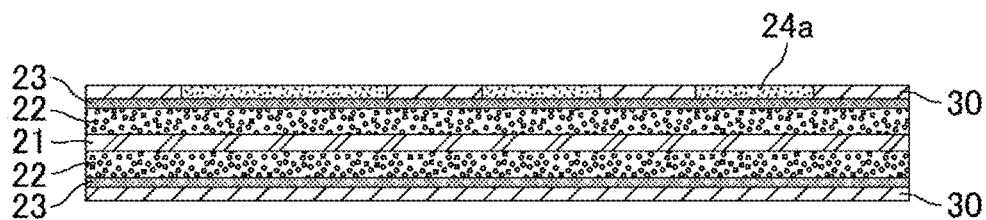
FIG. 5B is a sectional view thereof.

FIG. 5A is a perspective view schematically illustrating an example of a step of forming a solid electrolyte layer, and FIG. 5B is a sectional view thereof. A solid electrolyte layer 24a is formed on the dielectric layer 23. The solid electrolyte layer can be formed by, for example, a method for forming a polymerized film such as poly(3,4-ethylenedioxythiophene) on a surface of the dielectric layer using a treatment liquid containing a monomer such as 3,4-ethylenedioxythiophene, a method for applying a dispersion liquid of a polymer such as poly(3,4-ethylenedioxythiophene) on the surface of the dielectric layer and drying the dispersion liquid, or the like. The solid electrolyte layer is preferably formed such that an inner layer for filling pores of the dielectric layer is formed and then an outer layer for covering the dielectric layer is formed.

Figure 6A:
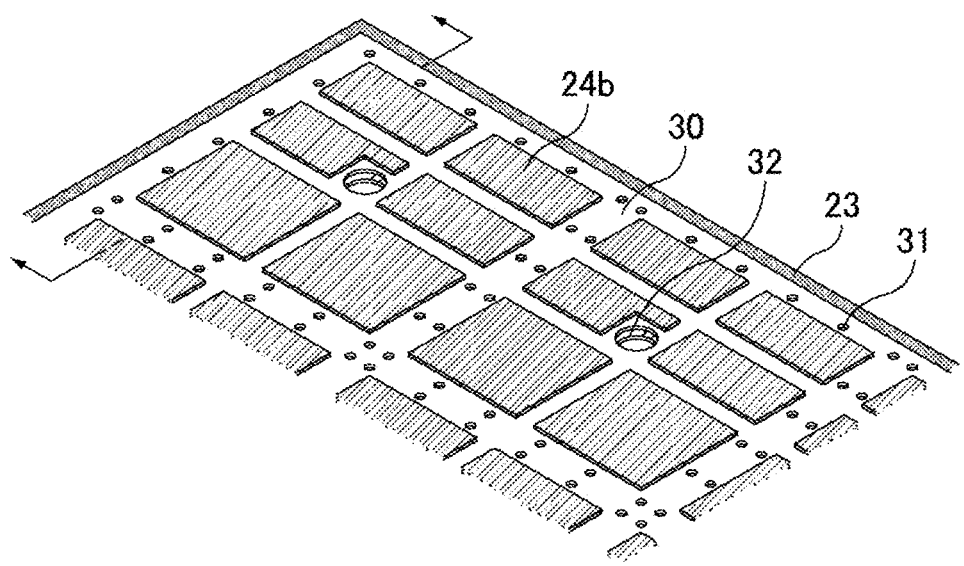
FIG. 6A is a perspective view schematically illustrating an example of a step of forming a carbon layer.
Figure 6B:
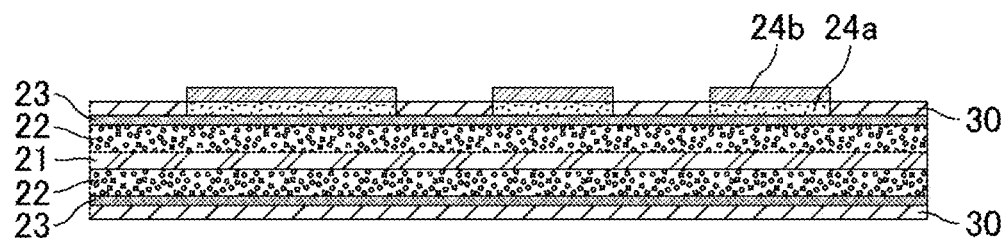
FIG. 6B is a sectional view thereof.

FIG. 6A is a perspective view schematically illustrating an example of a step of forming a carbon layer, and FIG. 6B is a sectional view thereof. A carbon layer 24b is formed on the solid electrolyte layer 24a. For example, the carbon layer can be formed by applying and drying a conductive adhesive paste containing a carbon filler.

Figure 7A:
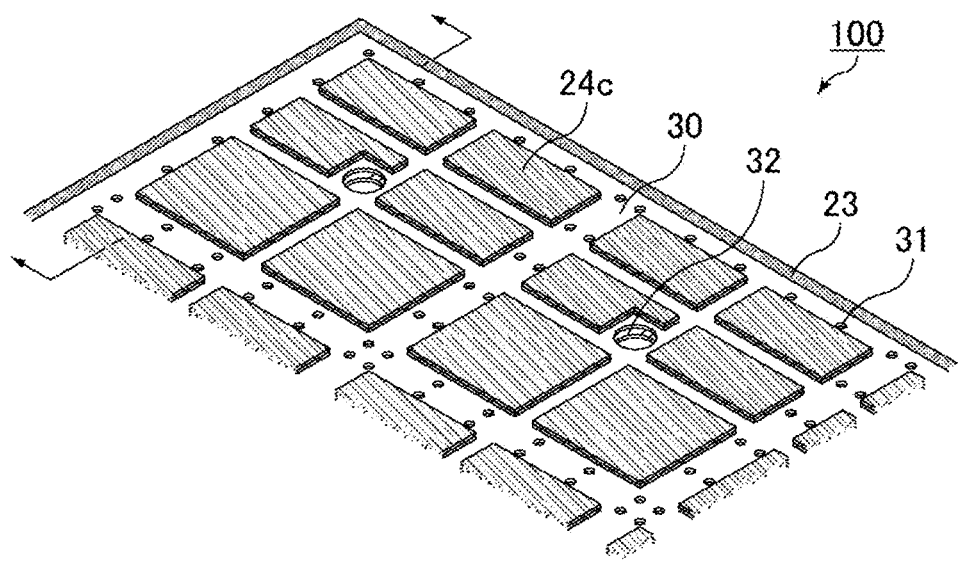
FIG. 7A is a perspective view schematically illustrating an example of a step of forming a copper layer.
Figure 7B:
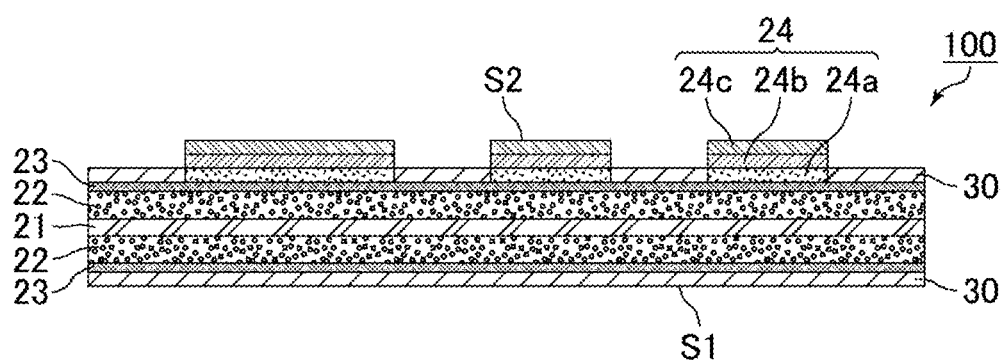
FIG. 7B is a sectional view thereof.

FIG. 7A is a perspective view schematically illustrating an example of a step of forming a copper layer, and FIG. 7B is a sectional view thereof. A copper layer 24c is formed on the carbon layer 24b. As a result, a cathode layer 24 including the solid electrolyte layer 24a, the carbon layer 24b, and the copper layer 24c is formed on the dielectric layer 23. For example, the copper layer may be formed using a conductive adhesive paste containing a copper filler, or the copper layer may be formed by copper plating processing.

The steps described above enable acquiring a solid electrolytic capacitor sheet 100 including the anode plate 21, the porous layer 22 provided on at least one main surface of the anode plate 21, the dielectric layer 23 provided on a surface of the porous layer 22, and the cathode layer 24 provided on a surface of the dielectric layer 23. As illustrated in FIG. 7B, the solid electrolytic capacitor sheet 100 has a first main surface S1 and a second main surface S2, facing each other in the thickness direction.

Next, as illustrated in FIGS. 8A and 8B, the first sealing layer in a sheet-like shape is disposed on the first main surface of the solid electrolytic capacitor sheet.

FIG. 8A is a perspective view schematically illustrating an example of the step of disposing the first sealing layer, and FIG. 8B is a sectional view thereof. A first sealing layer 11 is disposed on the first main surface S1 of the solid electrolytic capacitor sheet 100. For example, a sheet made of an insulating resin is bonded to the solid electrolytic capacitor sheet. The first sealing layer 11 may extend into some of the through-holes 31 and 32.

Figure 9A:
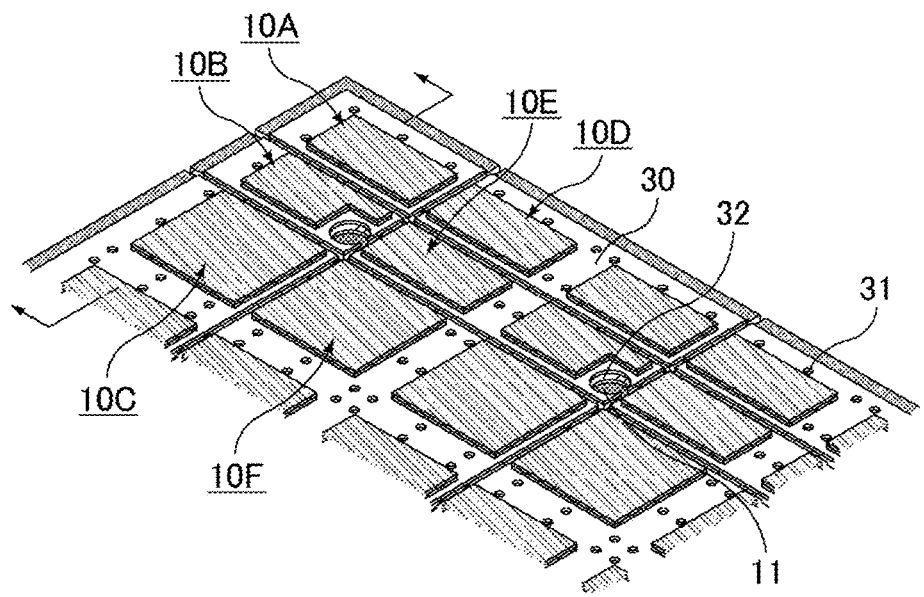
FIG. 9A is a perspective view schematically illustrating an example of a step of cutting a solid electrolytic capacitor sheet.
Figure 9B:
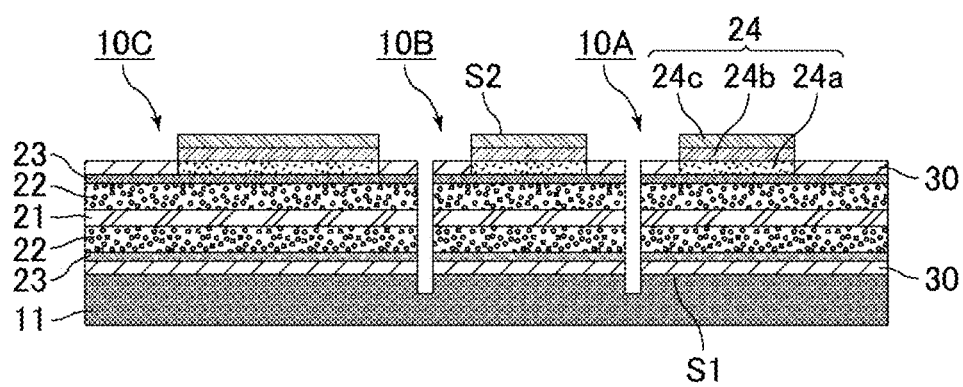
FIG. 9B is a sectional view thereof.

Subsequently, as illustrated in FIGS. 9A and 9B, the solid electrolytic capacitor sheet is cut in the thickness direction from the second main surface to be split into a plurality of solid electrolytic capacitor elements disposed on the first sealing layer. Examples of a method for the cutting include laser processing and dicing processing.

FIG. 9A is a perspective view schematically illustrating an example of a step of cutting the solid electrolytic capacitor sheet, and FIG. 9B is a sectional view thereof. The solid electrolytic capacitor sheet 100 is cut in the thickness direction from the second main surface S2 while the first sealing layer 11 on the first main surface S1 is used as a support. At this time, part of the first sealing layer 11 is also cut. As a result, the solid electrolytic capacitor sheet 100 is split into the solid electrolytic capacitor elements 10A, 10B, 10C, 10D, 10E, and 10F while being disposed on the first sealing layer 11. Strictly speaking, as illustrated in FIG. 9A, although a portion between capacitor array units adjacent to each other is not split into solid electrolytic capacitor elements, it is conceivable that the solid electrolytic capacitor sheet 100 is split into the solid electrolytic capacitor elements 10A, 10B, 10C, 10D, 10E, and 10F in one capacitor array unit.

Figure 10:
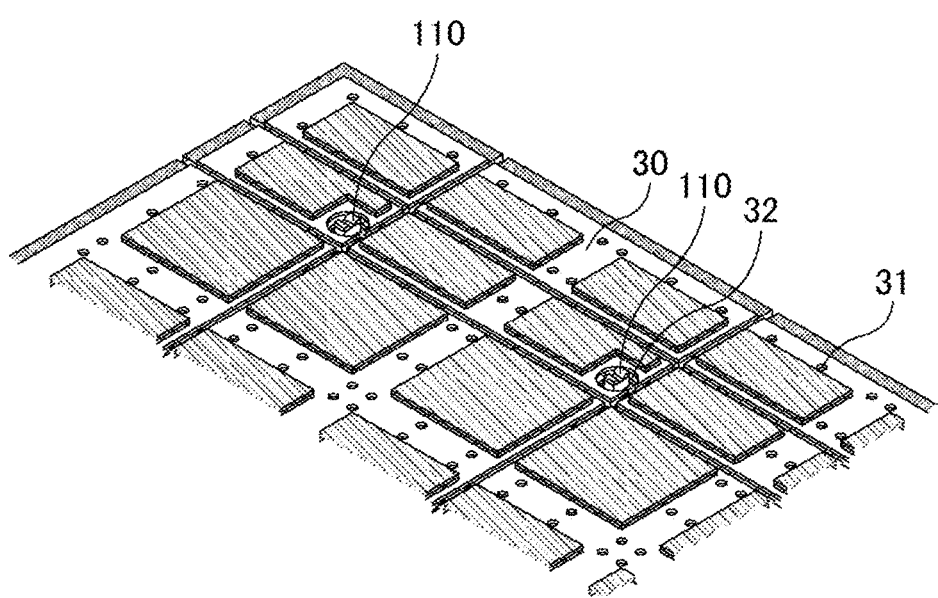
FIG. 10 is a perspective view schematically illustrating an example of a step of disposing a capacitor element different in type from a solid electrolytic capacitor element.

FIG. 10 is a perspective view schematically illustrating an example of a step of disposing a capacitor element different in type from the solid electrolytic capacitor element. As illustrated in FIG. 10, a capacitor element 110 different in type from the solid electrolytic capacitor element may be disposed in a space where the through-hole 32 is formed. Examples of the capacitor element different in type from the solid electrolytic capacitor element include a multilayer ceramic capacitor and a silicon capacitor.

Figure 11A:
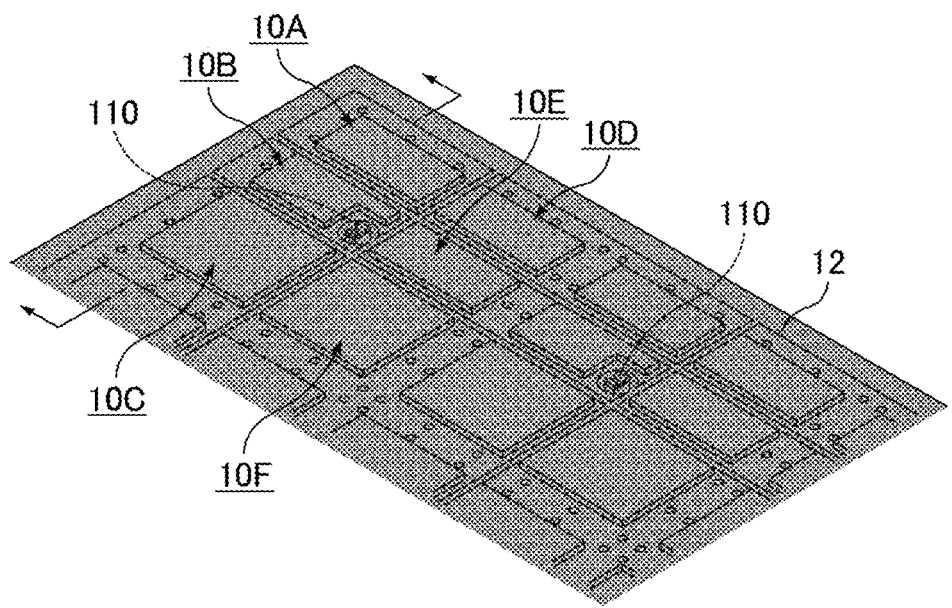
FIG. 11A is a perspective view schematically illustrating an example of a step of disposing a second sealing layer.
Figure 11B:
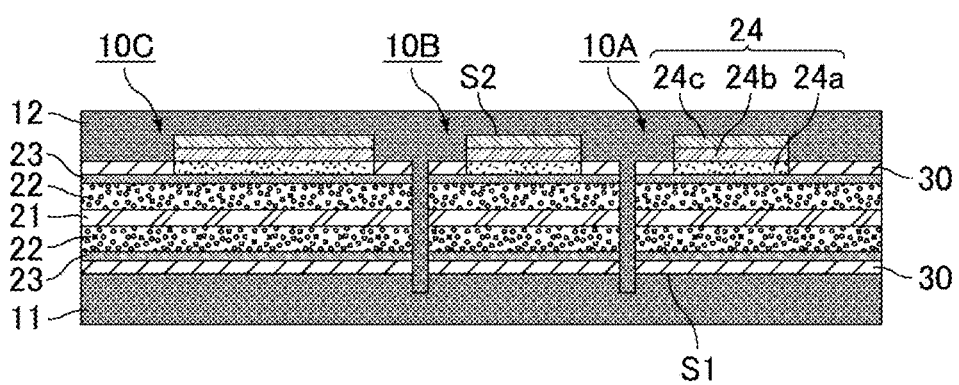
FIG. 11B is a sectional view thereof.

As illustrated in FIGS. 11A and 11B, a second sealing layer in a sheet-like shape is disposed to cover the plurality of solid electrolytic capacitor elements on the first sealing layer from above the second main surface (i.e., to cover the second main surface of the plurality of solid electrolytic capacitor elements).

FIG. 11A is a perspective view schematically illustrating an example of the step of disposing the second sealing layer, and FIG. 11B is a sectional view thereof. A second sealing layer 12 is disposed to cover the plurality of solid electrolytic capacitor elements 10A, 10B, 10C, 10D, 10E, and 10F from above the second main surface S2. For example, a sheet made of an insulating resin is bonded to the solid electrolytic capacitor elements. At this time, the second sealing layer 12 extends toward the first main surface S1 and into a gap between the anode plates 21 of the solid electrolytic capacitor elements adjacent to each other on the first sealing layer 11, and further extends into part of the first sealing layer 11.

Figure 12A:
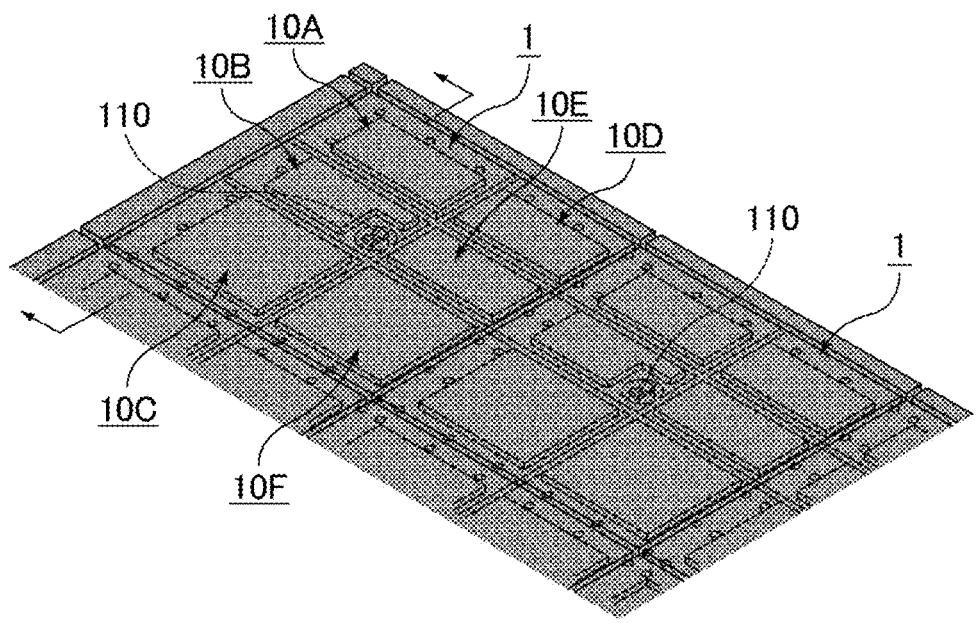
FIG. 12A is a perspective view schematically illustrating an example of a step of forming a plurality of split capacitor arrays.
Figure 12B:
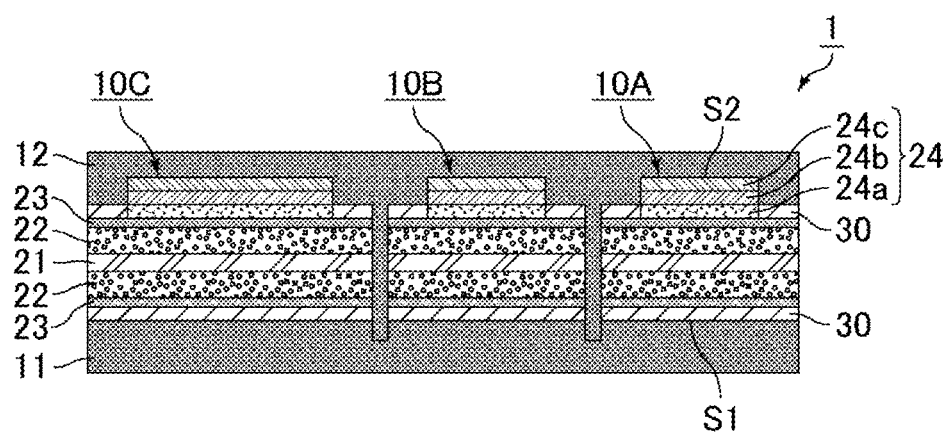
FIG. 12B is a sectional view thereof.

FIG. 12A is a perspective view schematically illustrating an example of a step of forming a plurality of split capacitor arrays, and FIG. 12B is a sectional view thereof. As illustrated in FIGS. 12A and 12B, when the solid electrolytic capacitor sheet 100 is cut for each capacitor array unit, a capacitor array 1 including a plurality of solid electrolytic capacitor elements 10A, 10B, 10C, 10D, 10E, and 10F mounted in one array can be obtained.

Although a large conversion foil is used to be split into a plurality of capacitor arrays in the above method, conversion foil having a size allowing one capacitor array alone to be obtained may be used to eliminate the step of forming a plurality of split capacitor arrays.

In the method for manufacturing the capacitor array according to the first embodiment of the present invention, the second sealing layer is preferably disposed after the solid electrolytic capacitor sheet is cut as in the method described above. However, part of the second sealing layer may be disposed, and the remaining second sealing layer may be disposed on the second main surface after the solid electrolytic capacitor sheet may be cut together with the part of the second sealing layer.

When the capacitor array according to the first embodiment of the present invention is manufactured, the capacitor array may be manufactured in which the anode plate is not split and the cathode layer is provided in a plurality of regions.

After the capacitor array is manufactured as described above, external electrodes connected to the anode plate and the cathode layer of the capacitor array are preferably formed outside the first sealing layer or the second sealing layer of the capacitor array. For example, an external electrode having a desired pattern can be formed by performing an etching process on copper foil after the copper foil is bonded. Hereinafter, the external electrode connected to the anode plate is also referred to as an anode external electrode, and the external electrode connected to the cathode layer is also referred to as a cathode external electrode.

Figure 13:
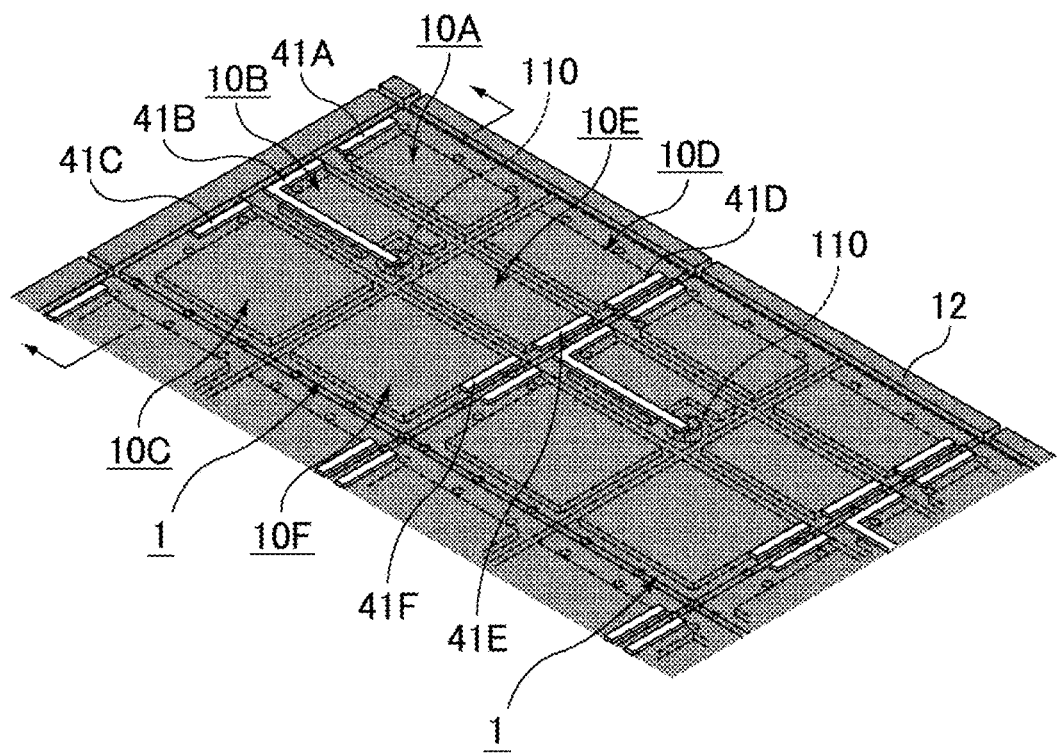
FIG. 13 is a perspective view schematically illustrating an example of a step of forming an anode external electrode.

FIG. 13 is a perspective view schematically illustrating an example of a step of forming an anode external electrode. FIG. 13 illustrates anode external electrodes 41A, 41B, 41C, 41D, 41E, and 41F that are formed outside the second sealing layer 12 for respective anode plates 21. As illustrated in FIG. 13, the anode external electrode 41B may be formed to connect the solid electrolytic capacitor element 10B and the capacitor element 110 in parallel.

Figure 14:
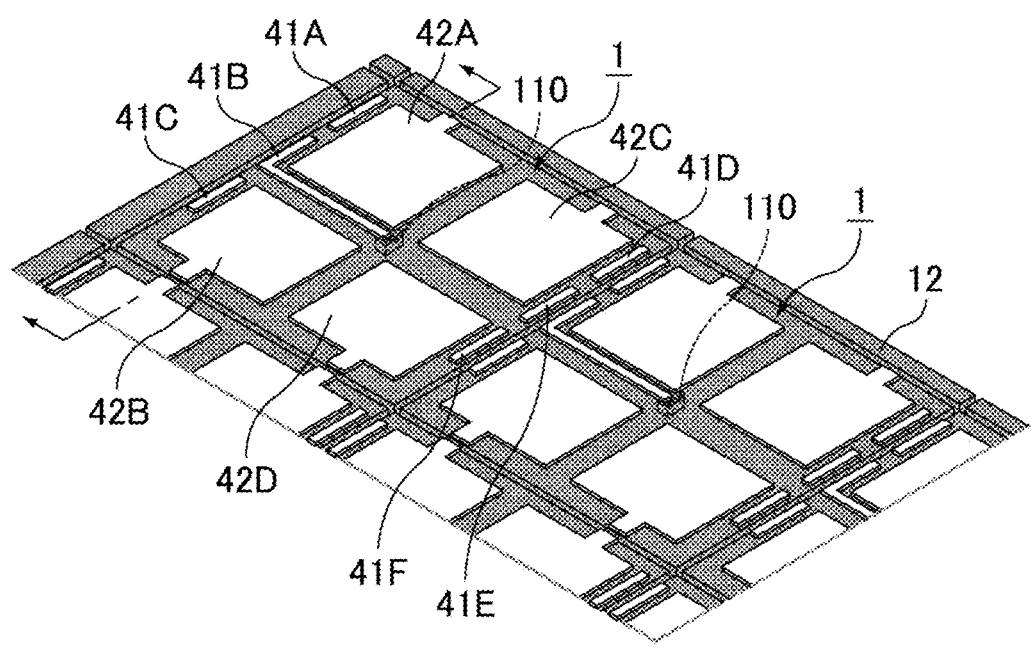
FIG. 14 is a perspective view schematically illustrating an example of a step of forming a cathode external electrode.

FIG. 14 is a perspective view schematically illustrating an example of a step of forming a cathode external electrode. FIG. 14 illustrates cathode external electrodes 42A, 42B, 42C, and 42D that are formed outside the second sealing layer 12. The cathode external electrode 42A is shared between and connected to the cathode layers 24 of the solid electrolytic capacitor elements 10A and 10B, and the cathode external electrode 42C is shared between and connected to the cathode layers 24 of the solid electrolytic capacitor elements 10D and 10E. A cathode external electrode may be formed for each cathode layer.

Figure 15:
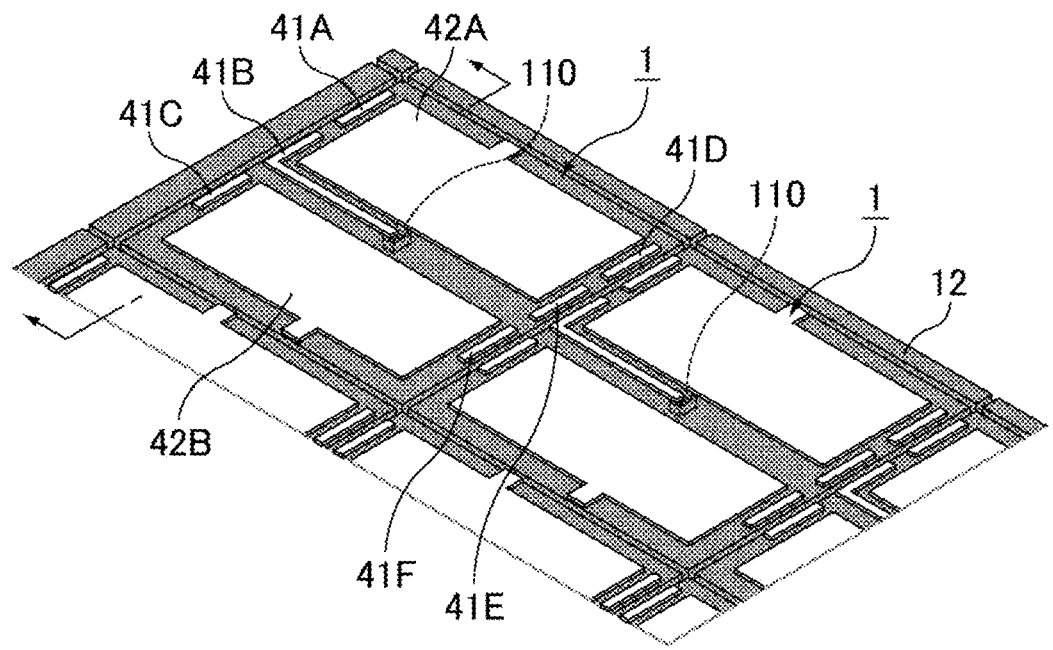
FIG. 15 is a perspective view schematically illustrating another example of the step of forming a cathode external electrode.

FIG. 15 is a perspective view schematically illustrating another example of the step of forming a cathode external electrode. FIG. 15 illustrates the cathode external electrodes 42A and 42B that are formed outside the second sealing layer 12. The cathode external electrode 42A is shared among and connected to the cathode layers 24 of the solid electrolytic capacitor elements 10A, 10B, 10D, and 10E, and the cathode external electrode 42B is shared between and connected to the cathode layers 24 of the solid electrolytic capacitor elements 10C and 10F.

Although not illustrated, a through-electrode passing through the second sealing layer (or the first sealing layer) in the thickness direction is preferably formed so that the anode plate and the anode external electrode are connected using the through-electrode to connect the cathode layer to the cathode external electrode. Although the method for forming the through-electrode is not particularly limited, examples thereof include a method for performing laser-via processing after the anode external electrode and the cathode external electrode are formed. The through-electrode may be formed before the first sealing layer or the second sealing layer is disposed, or the through-electrode may be formed before the anode external electrode and the cathode external electrode are formed after the first sealing layer or the second sealing layer is disposed.

Figure 16:
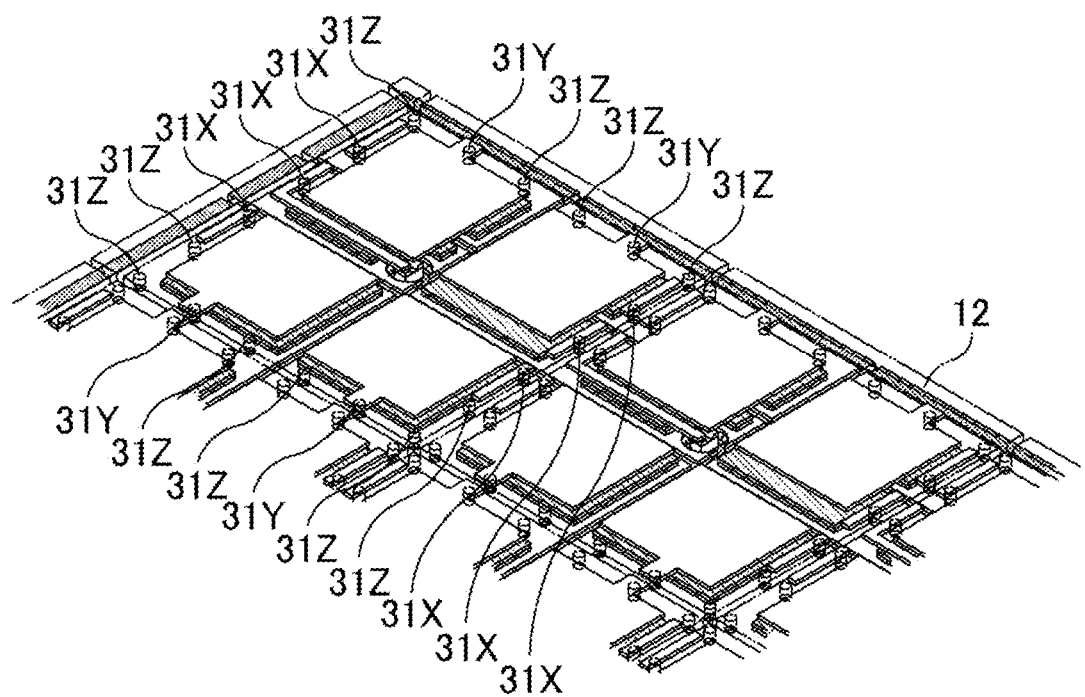
FIG. 16 is a transparent view of FIG. 14 for describing a function of a through-hole.
Figure 17:
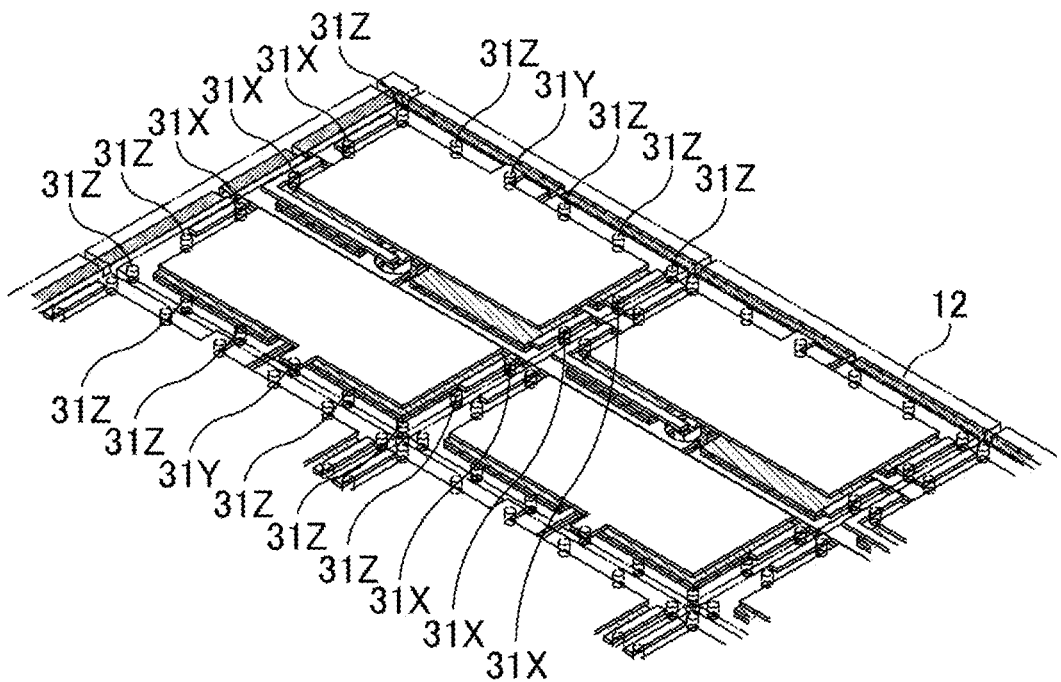
FIG. 17 is a transparent view of FIG. 15 for describing a function of a through-hole.

FIG. 16 is a transparent view of FIG. 14 for describing a function of a through-hole. FIG. 17 is a transparent view of FIG. 15 for describing a function of a through-hole. FIGS. 16 and 17 each illustrate a through-hole 31X that is used for connecting the anode plate and the external electrode, and a through-hole 31Y that is used for connecting the cathode layer and the external electrode. Additionally, a through-hole 31Z is used for connection of components other than the capacitors.

The anode external electrode and the cathode external electrode may be formed simultaneously or individually.

Second Embodiment

A capacitor array according to a second embodiment of the present invention is configured such that a plurality of element housing spaces are provided on the first sealing layer, and solid electrolytic capacitor elements are disposed in the respective element housing spaces.

Figure 18:
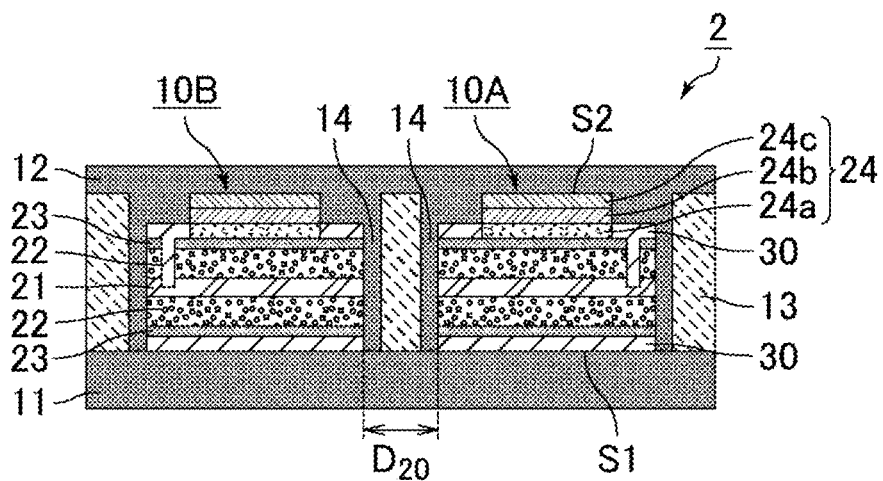
FIG. 18 is a sectional view schematically illustrating an example of a capacitor array according to a second embodiment of the present invention.

FIG. 18 is a sectional view schematically illustrating an example of the capacitor array according to the second embodiment of the present invention. FIG. 18 illustrates a capacitor array 2 that includes a plurality of solid electrolytic capacitor elements 10A and 10B, a first sealing layer 11 in a sheet-like shape, and a second sealing layer 12 in a sheet-like shape. The solid electrolytic capacitor element 10A has a first main surface S1 and a second main surface S2 facing each other in a thickness direction (top-bottom direction in FIG. 18), and the first main surface S1 is disposed on the first sealing layer 11. The same applies to the solid electrolytic capacitor element 10B. The second sealing layer 12 is disposed to cover the plurality of solid electrolytic capacitor elements 10A and 10B on the first sealing layer 11 from the second main surface S2. Thus, the capacitor array 2 illustrated in FIG. 18 has a sheet-like shape as a whole.

The capacitor array 2 illustrated in FIG. 18 includes a plurality of element housing spaces 14 provided above the first sealing layer 11, and the solid electrolytic capacitor elements 10A and 10B that are disposed in the respective element housing spaces 14. FIG. 18 illustrates an insulating substrate 13 having a plurality of cavities that is disposed on the first sealing layer 11 (see FIGS. 26A and 26B). The cavities of the insulating substrate 13 and the first sealing layer 11 form the respective element housing spaces 14.

The capacitor array 2 illustrated in FIG. 18 is provided with the solid electrolytic capacitor element 10A including an anode plate 21, a porous layer 22 provided on at least one main surface of the anode plate 21, a dielectric layer 23 provided on a surface of the porous layer 22, and a cathode layer 24 provided on a surface of the dielectric layer 23. FIG. 18 illustrates the cathode layer 24 including a solid electrolyte layer 24a provided on the surface of the dielectric layer 23, a carbon layer 24b provided on a surface of the solid electrolyte layer 24a, and a copper layer 24c provided on a surface of the carbon layer 24b. The same applies to the solid electrolytic capacitor element 10B. The solid electrolytic capacitor elements 10A, 10B, and 10C may be identical in structure, or may be different in structure partly or wholly.

As illustrated in FIG. 18, a distance from a bottom surface of the second sealing layer 12 to the anode plate 21 of each of the solid electrolytic capacitor elements 10A and 10B is preferably uniform.

As illustrated in FIG. 18, an insulating layer 30 for insulating the anode plate 21 and the cathode layer 24 is preferably provided on a surface of the dielectric layer 23 close to the second main surface S2 where the cathode layer 24 is not provided. Although FIG. 18 illustrates the insulating layer 30 that is provided on a surface of the dielectric layer 23 close to the first main surface S1, the insulating layer 30 may not be provided on the surface of the dielectric layer 23 close to the first main surface S1.

The capacitor array 2 illustrated in FIG. 18 is similar in other structures to the capacitor array 1 illustrated in FIG. 1.

When the capacitor array according to the second embodiment of the present invention includes the insulating substrate that has the plurality of cavities and that is disposed on the first sealing layer, the insulating substrate is preferably made of resin. Examples of the resin constituting the insulating substrate include insulating resins such as glass epoxy resin.

A method for providing the element housing spaces above the first sealing layer is not particularly limited for the capacitor array according to the second embodiment of the present invention, a method for forming a recess on a surface of the first sealing layer may, for example, be used other than a method for disposing, on the first sealing layer, an insulating substrate having a cavity.

Although the capacitor array according to the second embodiment of the present invention has a distance $D_{20}$ in FIG. 18 between the anode plates of the solid electrolytic capacitor elements adjacent to each other on the first sealing layer that is not particularly limited, the distance is preferably 150 µm to 1,000 µm, and more preferably 300 µm to 600 µm.

The capacitor array according to the second embodiment of the present invention includes the solid electrolytic capacitor element, the first sealing layer, the second sealing layer, and the like that are configured as described in the capacitor array according to the first embodiment of the present invention.

The capacitor array according to the second embodiment of the present invention is preferably manufactured as follows.

A method for manufacturing the capacitor array according to the second embodiment of the present invention includes the steps of: preparing a plurality of solid electrolytic capacitor elements each of which has a first main surface and a second main surface facing each other in a thickness direction; providing a plurality of element housing spaces above a first sealing layer in a sheet-like shape; disposing each of the plurality of solid electrolytic capacitor elements in corresponding one of the plurality of element housing spaces, the first main surface of each of the plurality of the solid electrolytic capacitor elements being disposed on the first sealing layer; and disposing a second sealing layer in a sheet-like shape covering the plurality of solid electrolytic capacitor elements on the first sealing layer from above the second main surface.

Hereinafter, an example of each step will be described.

First, as illustrated in FIGS. 19, 20, 21, 22, 23, 24, and 26, a solid electrolytic capacitor element is prepared.

Figure 19:
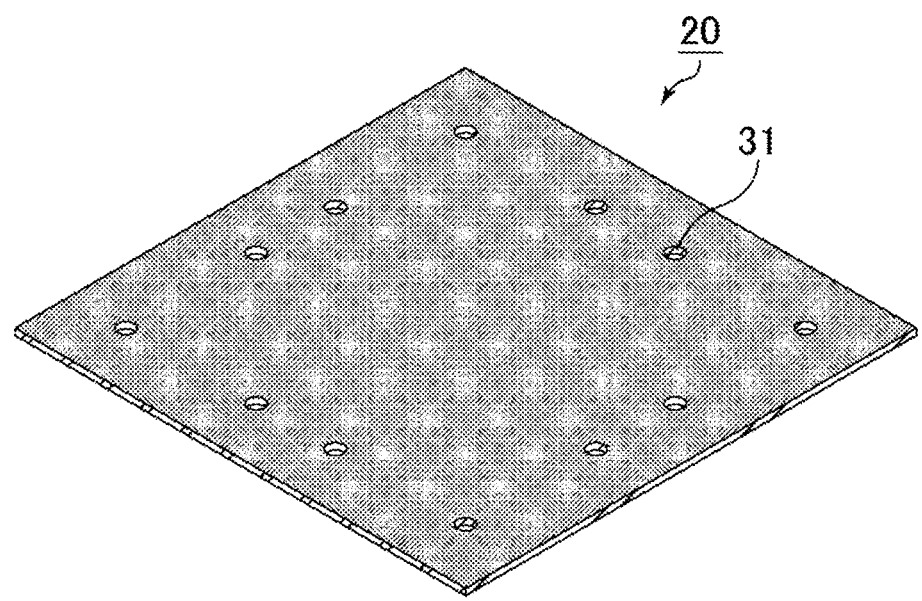
FIG. 19 is a perspective view schematically illustrating an example of a step of forming a through-hole in conversion foil.

FIG. 19 is a perspective view schematically illustrating an example of a step of forming a through-hole in conversion foil. First, as described in the first embodiment, conversion foil 20 is prepared. After that, as in the first embodiment, through-holes 31 passing through the conversion foil 20 in the thickness direction are formed at predetermined positions around a region to be a capacitor element.

Figure 20:
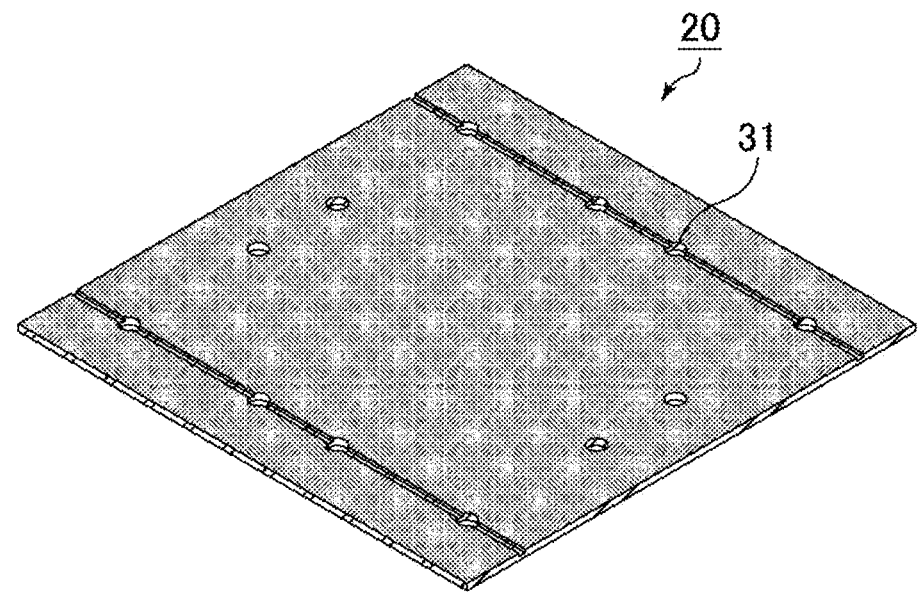
FIG. 20 is a perspective view schematically illustrating an example of a step of cutting a part of conversion foil.

FIG. 20 is a perspective view schematically illustrating an example of a step of cutting part of conversion foil. To extend the anode plate 21 (see FIG. 18) to the outside, part of the conversion foil 20 is cut in the thickness direction. The through-holes 31 may be formed after the part of the conversion foil 20 is cut.

Figure 21:
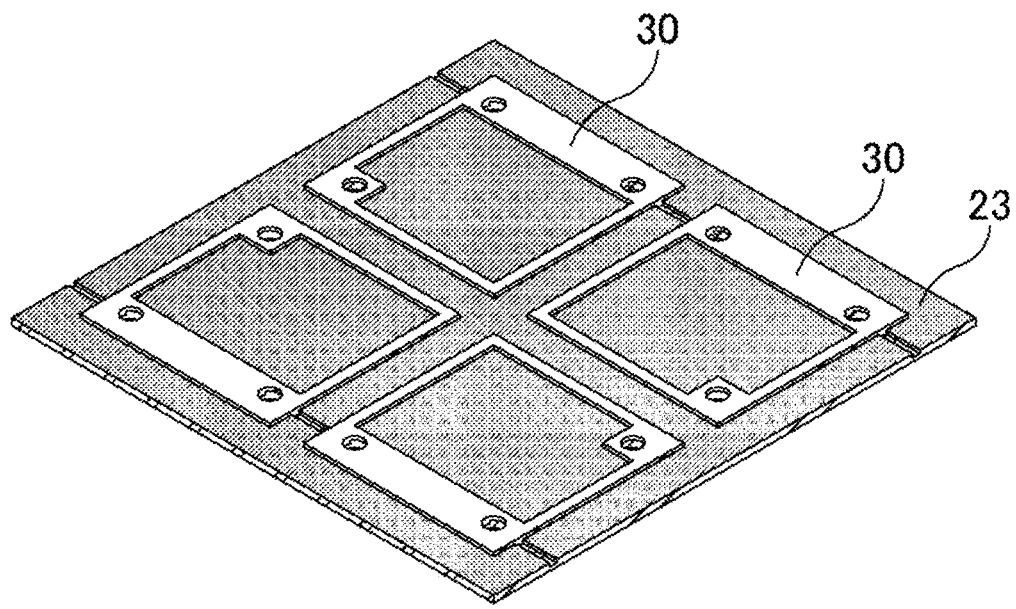
FIG. 21 is a perspective view schematically illustrating an example of a step of forming an insulating layer.

FIG. 21 is a perspective view schematically illustrating an example of a step of forming an insulating layer. To section an effective portion of the solid electrolytic capacitor element, an insulating resin is applied on the dielectric layer 23 to form an insulating layer 30. A method for applying the insulating resin is as described in the first embodiment.

Figure 22:
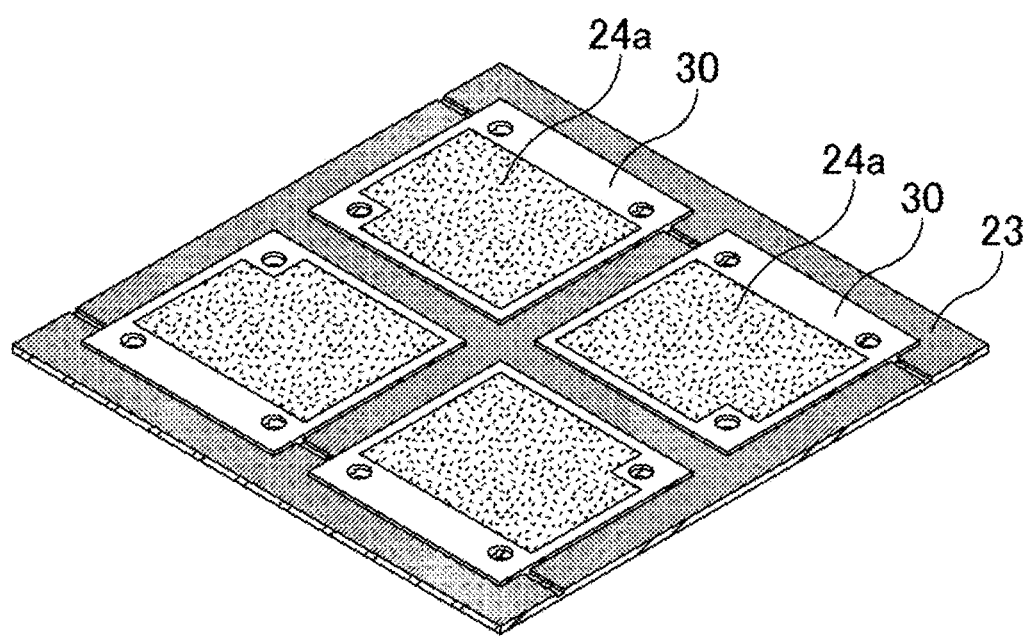
FIG. 22 is a perspective view schematically illustrating an example of a step of forming a solid electrolyte layer.

FIG. 22 is a perspective view schematically illustrating an example of a step of forming a solid electrolyte layer. A solid electrolyte layer 24a is formed on the dielectric layer 23. A method for forming the solid electrolyte layer is as described in the first embodiment.

Figure 23:
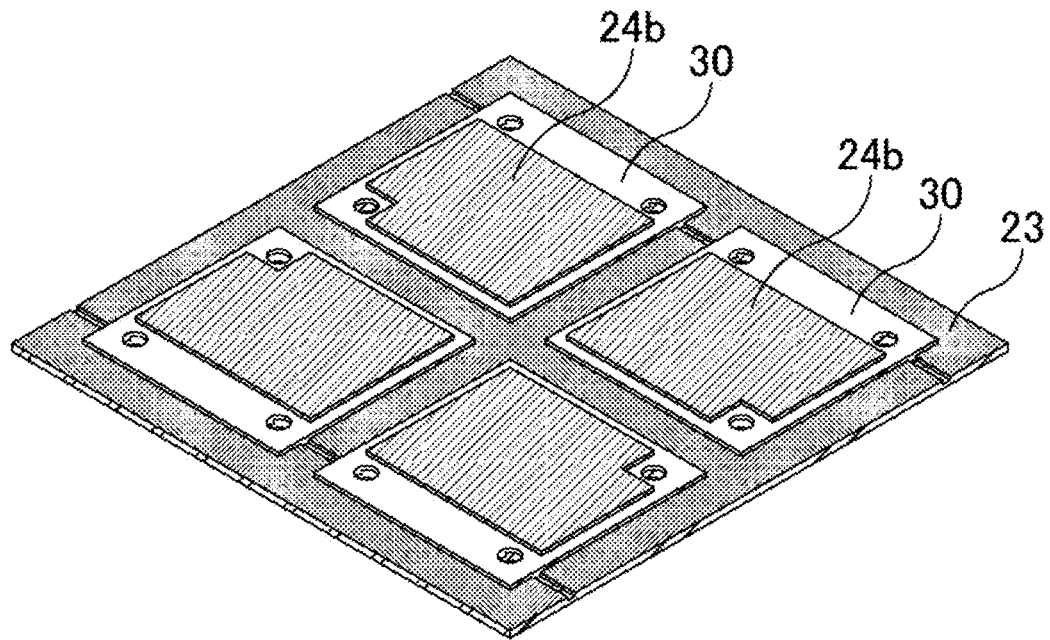
FIG. 23 is a perspective view schematically illustrating an example of a step of forming a carbon layer.

FIG. 23 is a perspective view schematically illustrating an example of a step of forming a carbon layer. A carbon layer 24b is formed on the solid electrolyte layer 24a. A method for forming the carbon layer is as described in the first embodiment.

Figure 24:
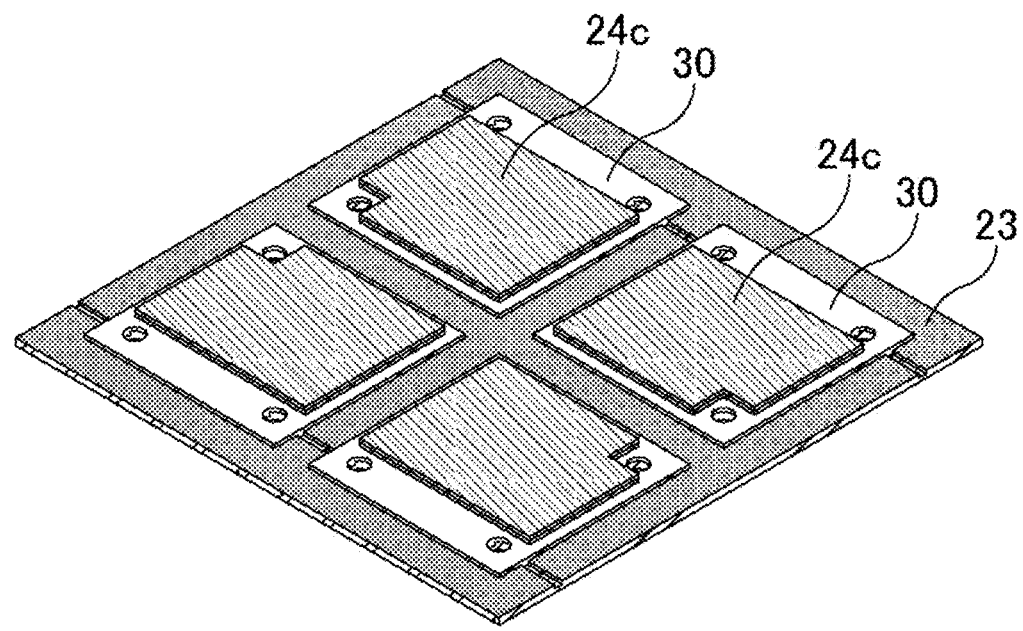
FIG. 24 is a perspective view schematically illustrating an example of a step of forming a copper layer.

FIG. 24 is a perspective view schematically illustrating an example of a step of forming a copper layer. A copper layer 24c is formed on the carbon layer 24b. As a result, a cathode layer 24 (see FIG. 18) including the solid electrolyte layer 24a, the carbon layer 24b, and the copper layer 24c is formed on the dielectric layer 23. A method for forming the copper layer is as described in the first embodiment.

Figure 25A:
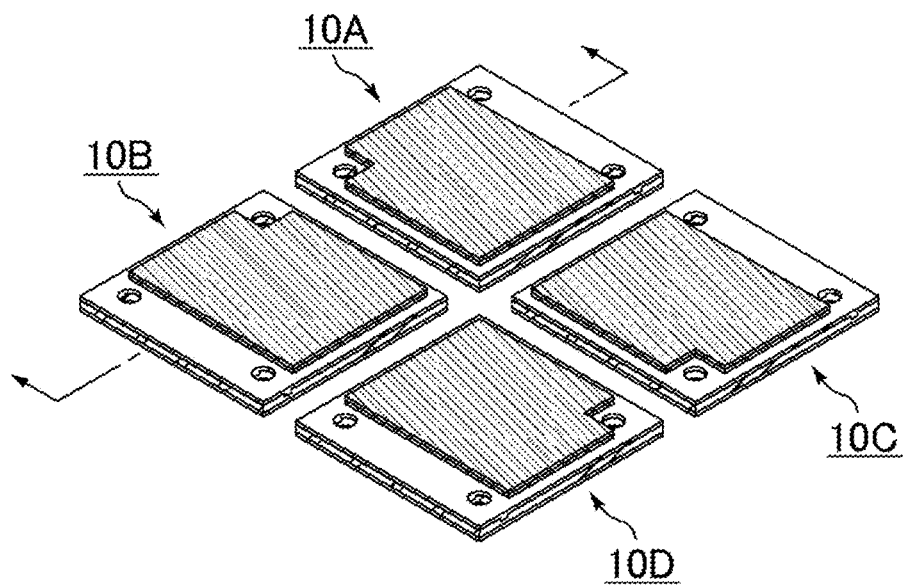
FIG. 25A is a perspective view schematically illustrating an example of a step of forming a plurality of split solid electrolytic capacitor elements.
Figure 25B:
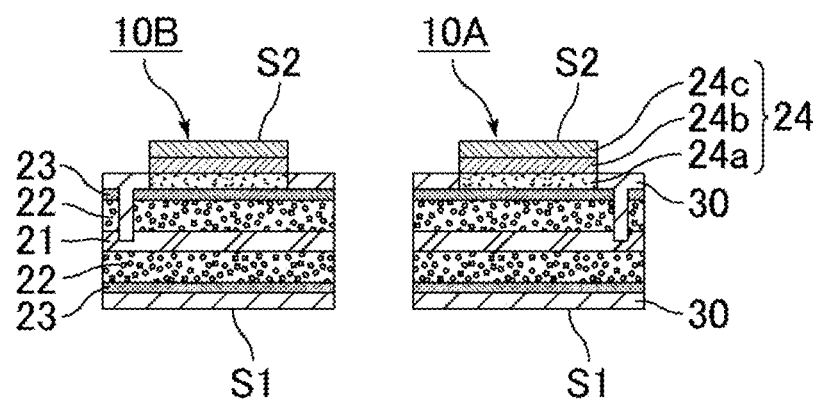
FIG. 25B is a sectional view thereof.

FIG. 25A is a perspective view schematically illustrating an example of a step of forming a plurality of split solid electrolytic capacitor elements, and FIG. 25B is a sectional view thereof. The conversion foil 20 formed with the cathode layer 24 is cut in the thickness direction to be split into a plurality of solid electrolytic capacitor elements 10A, 10B, 10C, and 10D. Examples of a method for the cutting include laser processing and dicing processing.

The steps described above enable acquiring the solid electrolytic capacitor elements 10A, 10B, 10C, and 10D each including the anode plate 21, the porous layer 22 provided on at least one main surface of the anode plate 21, the dielectric layer 23 provided on a surface of the porous layer 22, and the cathode layer 24 provided on a surface of the dielectric layer 23. As illustrated in FIG. 25B, the solid electrolytic capacitor element 10A has a first main surface S1 and a second main surface S2 facing each other in the thickness direction. The same applies to the solid electrolytic capacitor elements 10B, 10C, and 10D.

Figure 26A:
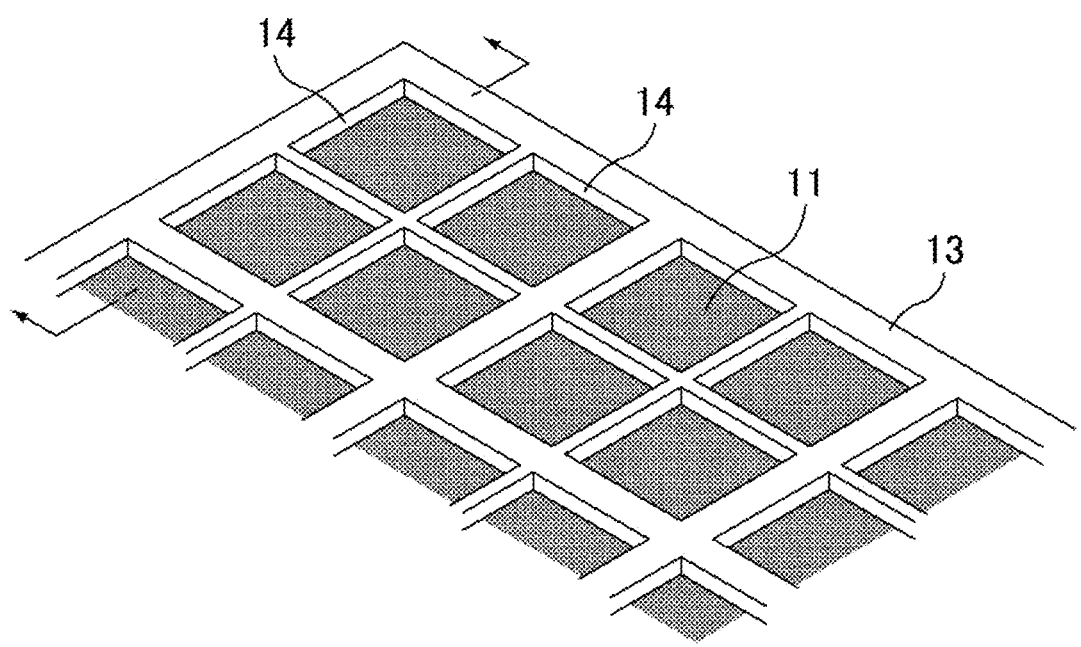
FIG. 26A is a perspective view schematically illustrating an example of a step of providing an element housing space above a first sealing layer.
Figure 26B:
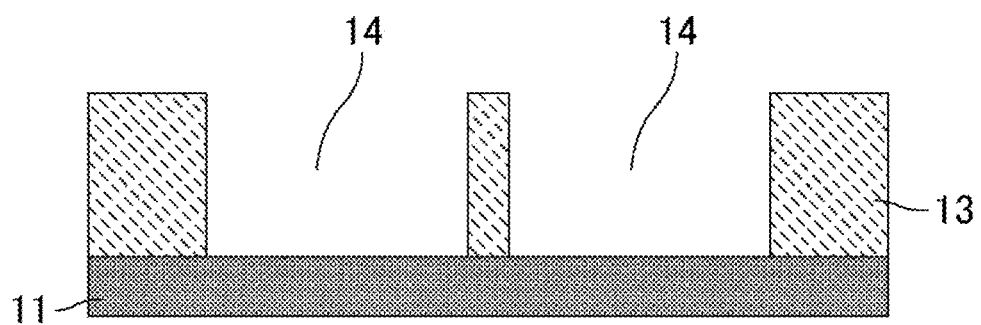
FIG. 26B is a sectional view thereof.

Next, as illustrated in FIGS. 26A and 26B, a plurality of element housing spaces are provided on the first sealing layer in a sheet-like shape.

FIG. 26A is a perspective view schematically illustrating an example of a step of providing the element housing spaces above the first sealing layer, and FIG. 26B is a sectional view thereof. An insulating substrate 13 having a plurality of cavities is disposed on a first sealing layer 11. The cavities of the insulating substrate 13 and the first sealing layer 11 form the respective element housing spaces 14. For example, a sheet made of an insulating resin is bonded to a substrate made of an insulating resin such as glass epoxy resin and having cavities. FIG. 26A illustrates a region in which two by two, that is, a total of four solid electrolytic capacitor elements are mounted, the region being defined as one capacitor array unit.

Figure 27A:
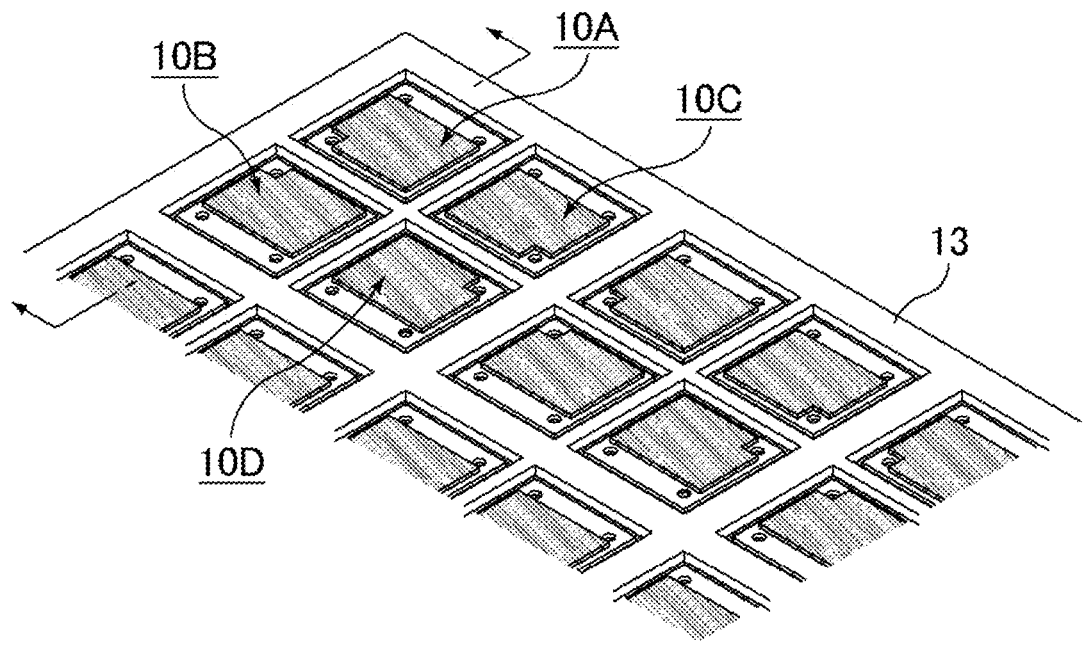
FIG. 27A is a perspective view schematically illustrating an example of a step of disposing a solid electrolytic capacitor element in an element housing space.
Figure 27B:
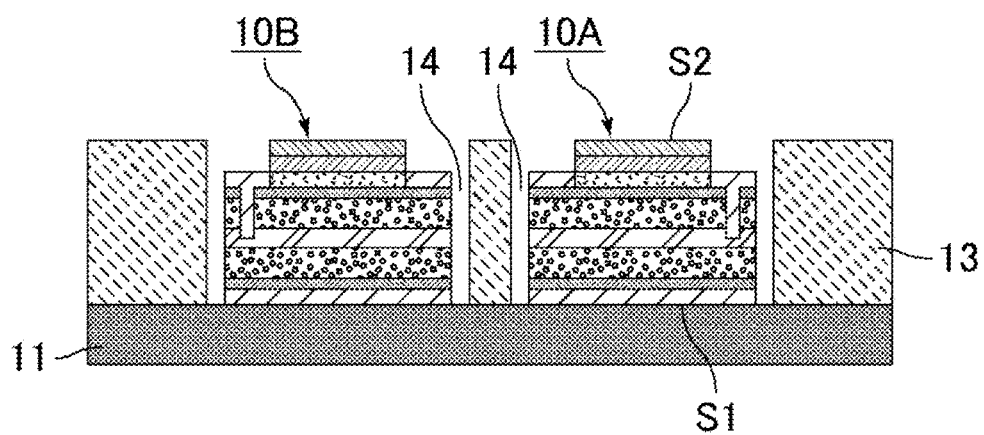
FIG. 27B is a sectional view thereof.

Subsequently, as illustrated in FIGS. 27A and 27B, the solid electrolytic capacitor elements are disposed in the respective element housing spaces such that the first main surface of each of the solid electrolytic capacitor elements is disposed on the first sealing layer.

FIG. 27A is a perspective view schematically illustrating an example of a step of disposing the solid electrolytic capacitor elements in the respective element housing spaces, and FIG. 27B is a sectional view thereof. The solid electrolytic capacitor elements 10A, 10B, 10C, and 10D are individually disposed in the respective element housing spaces 14 such that the first main surface S1 of each of the solid electrolytic capacitor elements is disposed on the first sealing layer 11. A gap is formed between each of the solid electrolytic capacitor elements and the insulating substrate 13.

Figure 28A:
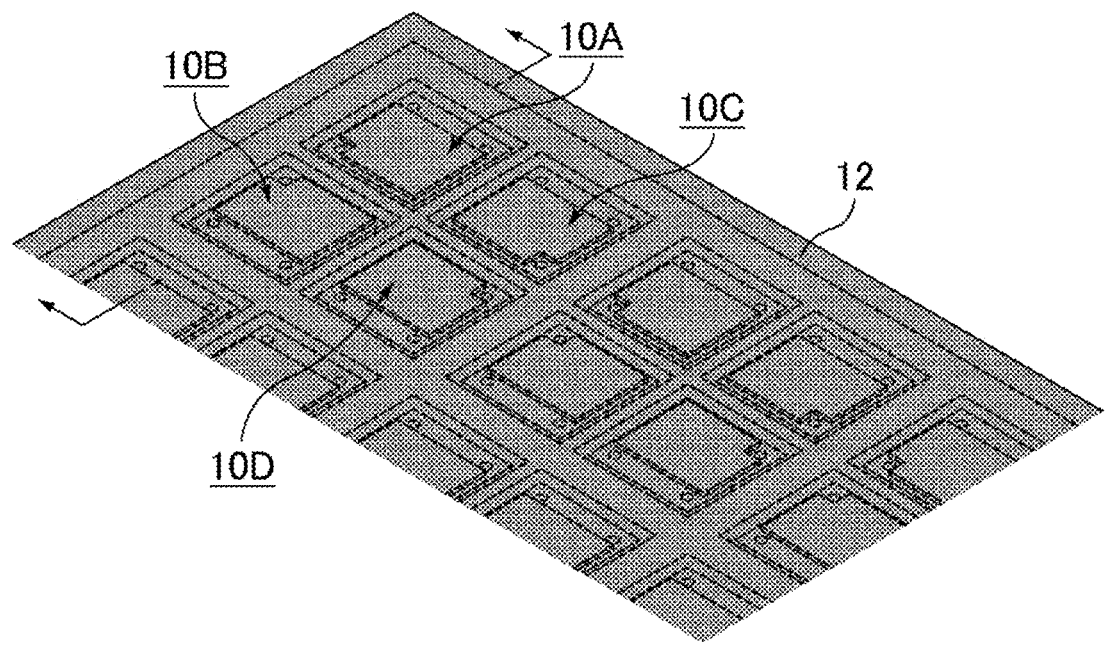
FIG. 28A is a perspective view schematically illustrating an example of a step of disposing a second sealing layer.
Figure 28B:
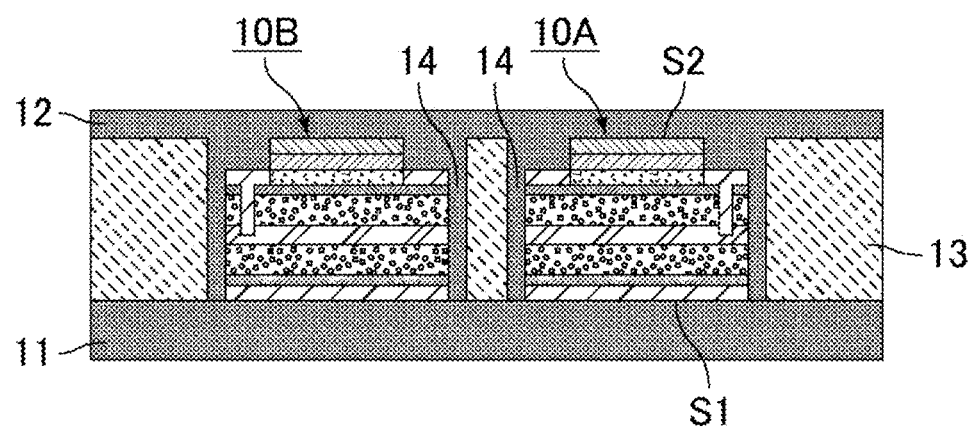
FIG. 28B is a sectional view thereof.

Then, as illustrated in FIGS. 28A and 28B, the second sealing layer in a sheet-like shape is disposed to cover the plurality of solid electrolytic capacitor elements on the first sealing layer from above the second main surface.

FIG. 28A is a perspective view schematically illustrating an example of a step of disposing the second sealing layer, and FIG. 28B is a sectional view thereof. The second sealing layer 12 is disposed to cover the plurality of solid electrolytic capacitor elements 10A, 10B, 10C, and 10D from above the second main surface S2. For example, a sheet made of an insulating resin is bonded to the solid electrolytic capacitor elements. At this time, the second sealing layer 12 enters the element housing spaces 14 toward the first main surface S1 to fill gaps between the solid electrolytic capacitor elements and the corresponding element housing spaces.

Figure 29A:
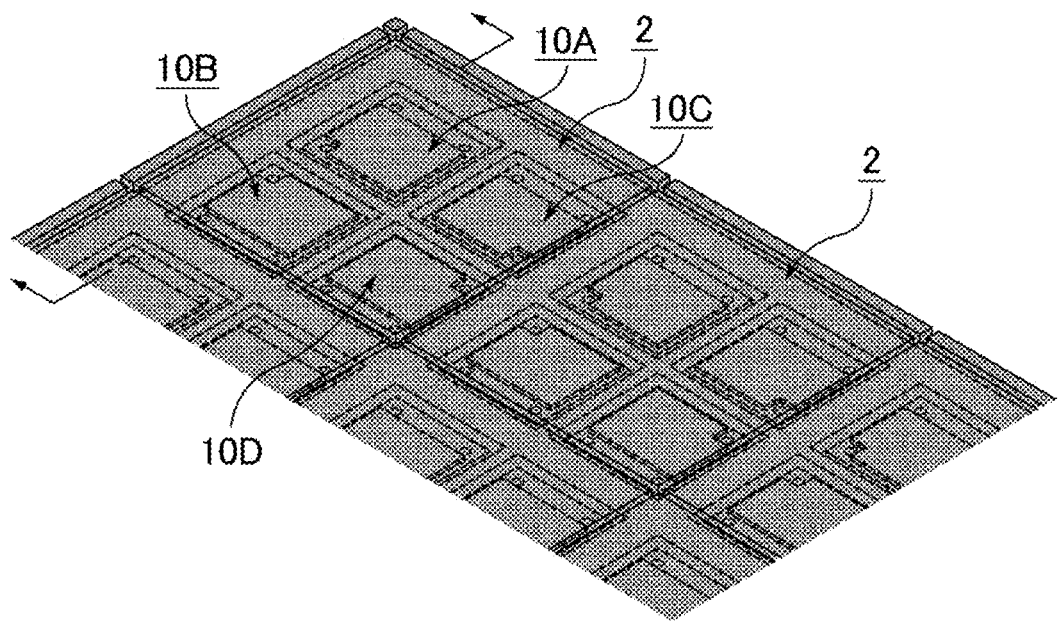
FIG. 29A is a perspective view schematically illustrating an example of a step of forming a plurality of split capacitor arrays.
Figure 29B:
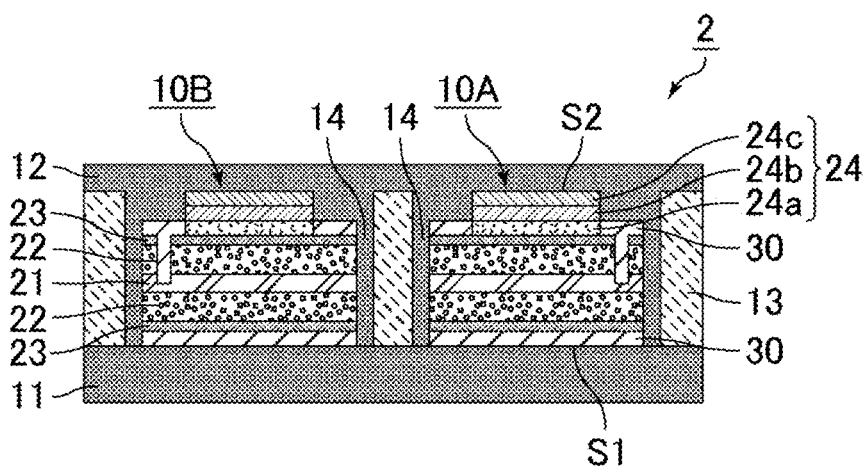
FIG. 29B is a sectional view thereof.

FIG. 29A is a perspective view schematically illustrating an example of a step of forming a plurality of split capacitor arrays, and FIG. 29B is a sectional view thereof. As illustrated in FIGS. 29A and 29B, cutting for each capacitor array unit enables a capacitor array 2 in which a plurality of solid electrolytic capacitor elements 10A, 10B, 10C, and 10D are mounted in one array to be obtained.

Although a large insulating substrate is used to be split into a plurality of capacitor arrays in the above method, an insulating substrate having a size allowing one capacitor array alone to be obtained may be used to eliminate the step of forming a plurality of split capacitor arrays.

After the capacitor array is manufactured as described above, external electrodes connected to the anode plate and the cathode layer of the capacitor array are preferably formed outside the first sealing layer or the second sealing layer of the capacitor array. A method for forming the external electrodes is as described in the first embodiment.

Figure 30:
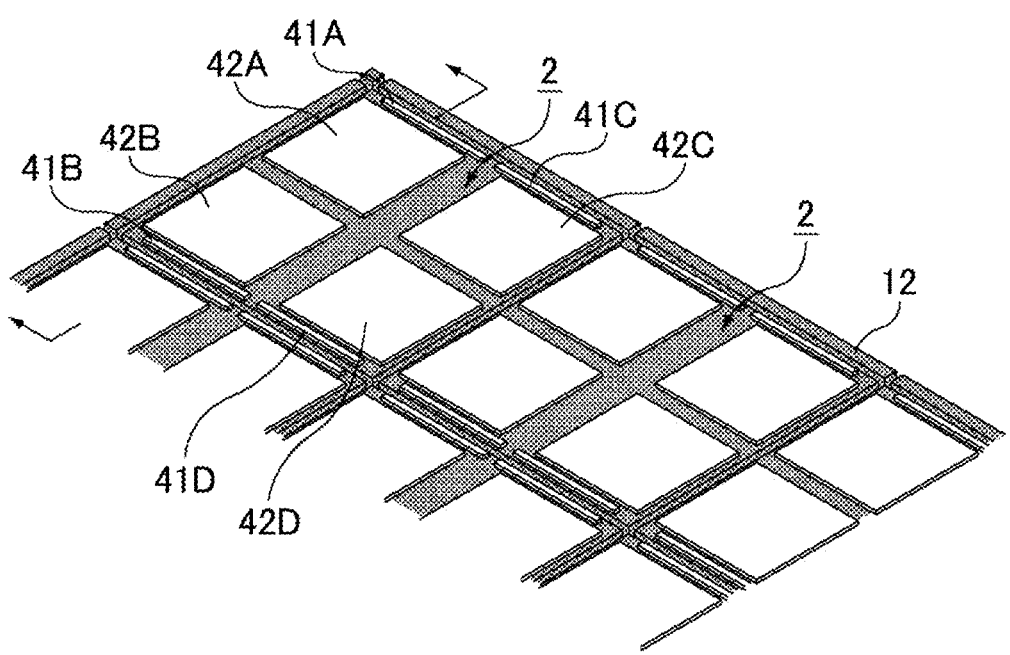
FIG. 30 is a perspective view schematically illustrating an example of a step of forming an anode external electrode and a cathode external electrode.

FIG. 30 is a perspective view schematically illustrating an example of a step of forming an anode external electrode and a cathode external electrode. FIG. 30 illustrates anode external electrodes 41A, 41B, 41C, and 41D for respective anode plates 21, and cathode external electrodes 42A, 42B, 42C, and 42D for respective cathode layers 24, which are formed outside the second sealing layer 12. As described in the first embodiment, a cathode external electrode shared among and connected to the cathode layers of the plurality of solid electrolytic capacitor elements may be formed.

Although not illustrated, a through-electrode passing through the second sealing layer (or the first sealing layer) in the thickness direction is preferably formed so that the anode plate and the anode external electrode are connected using the through-electrode and the cathode layer and the cathode external electrode are connected using the through-electrode. A method for forming the through-electrode is as described in the first embodiment.

Other Embodiments

The capacitor array of the present invention is not limited to the above embodiments, and various applications and modifications can be added for structure, manufacturing conditions, and the like, of the capacitor array, within the scope of the present invention. A method for expressing functions of the capacitor array of the present invention is not particularly limited. The capacitor array of the present invention may be provided with an external electrode in a state capable of surface mounting, or may function as a component built in a substrate, or another electronic component may be mounted on the capacitor array of the present invention.

For example, the capacitor array of the present invention may further include a capacitor element that is different in type from the solid electrolytic capacitor element and that is supported by the first sealing layer or the second sealing layer. In that case, the capacitor element different in type from the solid electrolytic capacitor element may be enclosed in the first sealing layer or the second sealing layer, or may be provided outside the first sealing layer or the second sealing layer.

Figure 31:
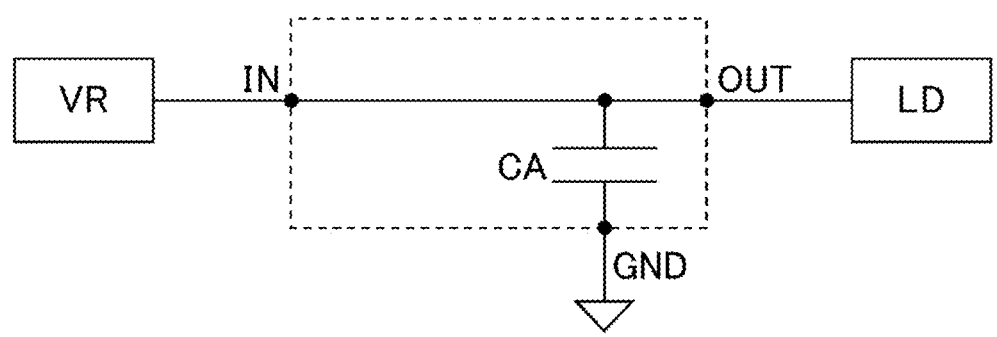
FIG. 31 is a circuit diagram schematically illustrating an example of a method of use of a capacitor array of the present invention.

FIG. 31 is a circuit diagram schematically illustrating an example of a method of use of a capacitor array of the present invention. For example, a step-down switching regulator of a chopper type can be formed using a capacitor array CA that is electrically connected between a voltage regulator VR including a semiconductor active element and a load LD to which converted DC voltage is supplied, and an inductor that is similarly connected. The capacitor array may also be used as an LC filter that smooths output of a voltage regulator. Various elements are connected to a circuit that is basically without an inductor. FIG. 31 illustrates GND that indicates the ground.

[Composite Electronic Component]

A composite electronic component of the present invention includes the capacitor array of the present invention, external electrodes provided outside the first sealing layer or the second sealing layer of the capacitor array and connected to the anode plate and the cathode layer of the capacitor array, and an electronic component connected to the external electrodes.

In the composite electronic component of the present invention, the electronic component connected to the external electrodes may be a passive element or an active element. Both the passive element and the active element may be connected to the external electrodes, or any one of the passive element and the active element may be connected to the external electrodes. Additionally, a composite of passive and active elements may be connected to the external electrodes.

Examples of the passive element include an inductor. Examples of the active element include a memory, a graphical processing unit (GPU), a central processing unit (CPU), a micro processing unit (MPU), a power management IC (PMIC), and the like.

As described above, the capacitor array of the present invention as a whole has a sheet-like shape. Thus, in the composite electronic component of the present invention, the capacitor array can be treated like a mounting substrate, and an electronic component can be mounted on the capacitor array. Additionally, forming each of electronic components to be mounted on the capacitor array in a sheet-like shape enables the capacitor array and the electronic components to be connected in a thickness direction via a through-electrode passing through each of the electronic components in the thickness direction. As a result, an active element and a passive element can be configured collectively as a module.

DESCRIPTION OF REFERENCE SYMBOLS 1,2: capacitor array
10A,10B,10C,10D,10E,10F: solid electrolytic capacitor element
11: first sealing layer
12: second sealing layer
13: insulating substrate
14: element housing space
20: conversion foil
21: anode plate
22: porous layer
23: dielectric layer
24: cathode layer
24$a$: solid electrolyte layer
24$b$: carbon layer
24$c$: copper layer
30: insulating layer
31, 31X, 31Y, 31Z, 32: through-hole
41A, 41B, 41C, 41D, 41E, 41F: anode external electrode
42A, 42B, 42C, 42D: cathode external electrode
100: solid electrolytic capacitor sheet
110: capacitor element different in type from solid electrolytic capacitor element
S1: first main surface
S2: second main surface
$D_{10}$, $D_{20}$: distance between anode plates

The invention claimed is:

1. A capacitor array comprising;
a plurality of solid electrolytic capacitor elements each of which has a first main surface and a second main surface facing each other in a thickness direction and includes an anode plate made of a valve action metal, a porous layer on at least one surface of the anode plate, a dielectric layer on a surface of the porous layer, and a cathode layer on a surface of the dielectric layer and including a solid electrolyte layer;
a first sealing layer in a sheet-like shape and completely covering the first main surface of each of the plurality of solid electrolytic capacitor elements;
a second sealing layer in a sheet-like shape and covering the second main surface of the plurality of solid electrolytic capacitor elements; and
a plurality of element housing spaces provided above the first sealing layer,
wherein each of the solid electrolytic capacitor elements is disposed in corresponding one of the element housing spaces.

2. The capacitor array according to claim 1, wherein a distance from a bottom surface of the second sealing layer to the anode plate of each of the solid electrolytic capacitor elements is uniform.

3. The capacitor array according to claim 1, wherein the second sealing layer extends toward the first sealing layer and into a gap between the anode plates of adjacent solid electrolytic capacitor elements of the plurality of solid electrolytic capacitor elements.

4. The capacitor array according to claim 1, wherein a distance between the anode plates of adjacent solid electrolytic capacitor elements of the plurality of solid electrolytic capacitor elements is 30 μm to 500 μm.

5. The capacitor array according to claim 1, further comprising a capacitor element being different in type from the solid electrolytic capacitor elements and being supported by the first sealing layer or the second sealing layer.

6. A composite electronic component comprising:
the capacitor array according to claim 1;
external electrodes outside the first sealing layer or the second sealing layer of the capacitor array and respectively electrically connected to the anode plate and the cathode layer of the capacitor array; and
an electronic component electrically connected to the external electrodes.

7. The composite electronic component according to claim 6, wherein the electronic component is a passive element.

8. The composite electronic component according to claim 6, wherein the electronic component is an active element.

9. A capacitor array comprising:
- a plurality of solid electrolytic capacitor elements each of which has a first main surface and a second main surface facing each other in a thickness direction and includes an anode plate made of a valve action metal, a porous layer on at least one surface of the anode plate, a dielectric layer on a surface of the porous layer, and a cathode layer on a surface of the dielectric layer and including a solid electrolyte layer;
- a first sealing layer in a sheet-like shape and covering the first main surface of the plurality of solid electrolytic capacitor elements; and
- a second sealing layer in a sheet-like shape and covering the second main surface of the plurality of solid electrolytic capacitor elements,
- wherein the second sealing layer extends toward the first sealing layer and into a gap between the anode plates of adjacent solid electrolytic capacitor elements of the plurality of solid electrolytic capacitor elements, and
- wherein the second sealing layer further extends into part of the first sealing layer.

\* \* \* \* \*